(12) United States Patent
Koyama et al.

(10) Patent No.: US 11,401,350 B2
(45) Date of Patent: Aug. 2, 2022

(54) POLYSACCHARIDE DERIVATIVE

(71) Applicant: KAO CORPORATION, Tokyo (JP)

(72) Inventors: Akihiro Koyama, Adachi-ku (JP); Yoichiro Imori, Wakayama (JP); Takanori Saito, Kita-ku (JP); Akifumi Kobayashi, Utsunomiya (JP); Takahiro Yano, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 16/769,527

(22) PCT Filed: Dec. 5, 2018

(86) PCT No.: PCT/JP2018/044718
§ 371 (c)(1),
(2) Date: Jun. 3, 2020

(87) PCT Pub. No.: WO2019/111946
PCT Pub. Date: Jun. 13, 2019

(65) Prior Publication Data
US 2020/0385492 A1    Dec. 10, 2020

(30) Foreign Application Priority Data

Dec. 6, 2017   (JP) .............................. JP2017-234703
Dec. 6, 2017   (JP) .............................. JP2017-234706

(51) Int. Cl.
| C08B 11/145 | (2006.01) |
| C08B 11/193 | (2006.01) |
| C08B 37/00  | (2006.01) |
| C11D 3/22   | (2006.01) |

(52) U.S. Cl.
CPC .......... *C08B 11/145* (2013.01); *C08B 11/193* (2013.01); *C08B 37/00* (2013.01); *C11D 3/227* (2013.01)

(58) Field of Classification Search
CPC ..... C08B 11/145; C08B 11/193; C08B 37/00; C08B 37/0096
See application file for complete search history.

(56) References Cited

U.S. PATENT DOCUMENTS

| 4,000,093 | A |   | 12/1976 | Nicol et al. |
| 4,663,159 | A |   | 5/1987  | Brode, II et al. |
| 5,948,744 | A |   | 9/1999  | Baillely |
| 6,121,439 | A | * | 9/2000  | Kroon ...................... C09D 7/47 536/43 |
| 6,833,347 | B1 |  | 12/2004 | Wang |
| 2004/0151681 | A1 | | 8/2004 | Busk et al. |
| 2005/0043415 | A1 | | 2/2005 | Munoz |
| 2006/0000702 | A1 | | 4/2006 | Spittle |
| 2006/0182703 | A1 | | 8/2006 | Arisz et al. |
| 2008/0280807 | A1 | | 11/2008 | Grainger |
| 2010/0204079 | A1 | | 8/2010 | Mcauliffe et al. |
| 2011/0177018 | A1 | | 7/2011 | Lipic |
| 2011/0268778 | A1 | | 11/2011 | Dihora |
| 2011/0268802 | A1 | | 11/2011 | Dihora |
| 2011/0269658 | A1 | | 11/2011 | Dihora |
| 2011/0274627 | A1 | | 11/2011 | Alwattari |
| 2011/0318285 | A1 | | 12/2011 | Erazo-Majewicz et al. |
| 2013/0130949 | A1 | | 5/2013 | Partain, III et al. |
| 2013/0209388 | A1 | | 8/2013 | Erazo-Majewicz et al. |
| 2015/0239993 | A1 | | 8/2015 | Miyoshi et al. |
| 2016/0122441 | A1 | | 5/2016 | Miyoshi et al. |
| 2017/0335242 | A1 | | 11/2017 | Eldredge |
| 2020/0392429 | A1 | | 12/2020 | Yamawaki |

FOREIGN PATENT DOCUMENTS

| CN | 101171264 A | 4/2008 |
| CN | 101415809 A | 4/2009 |
| CN | 101935357 A | 1/2011 |
| CN | 102391381 A | 3/2012 |
| CN | 105142731 A | 12/2015 |
| EP | 1100851 B1 | 7/2004 |
| EP | 3722358 A1 | 10/2020 |
| EP | 3722400 A1 | 10/2020 |

(Continued)

OTHER PUBLICATIONS

Google machine translation of JP2014169417A, https://patents.google.com, accessed online on Apr. 9, 2021. (Year: 2021).*
U.S. Appl. No. 16/769,542, filed Jun. 3, 2020.
U.S. Appl. No. 16/769,446, filed Jun. 3, 2020.
U.S. Appl. No. 16/769,424, filed Jun. 3, 2020.
International Search Report for PCT/JP2018/044720 dated Mar. 5, 2019, with English translation.
International Search Report for PCT/JP2018/044721 dated Feb. 12, 2019, with English translation.
International Search Report for PCT/JP2018/044722 dated Feb. 12, 2019, with English translation.

(Continued)

*Primary Examiner* — Jonathan S Lau
(74) *Attorney, Agent, or Firm* — Element IP, PLC

(57) ABSTRACT

The present invention relates to a polysaccharide derivative which is able to not only enhance cleaning properties of clothing, etc. but also suppress resoiling due to powder soil during washing.

The polysaccharide derivative is a polysaccharide derivative having a cationic group and a hydrocarbon group (R) having 2 or more carbon atoms, wherein the hydrocarbon group (R) is bound to a group resulting from eliminating a hydrogen atom from a hydroxy group of a hydroxyalkylated polysaccharide, directly or via a hydrocarbon group having an oxygen atom; the hydroxyalkylated polysaccharide is a hydroxyethylated polysaccharide or a hydroxypropylated polysaccharide; and the hydroxyalkylated polysaccharide has a weight average molecular weight of 10,000 or more and 740,000 or less.

19 Claims, No Drawings

(56) References Cited

FOREIGN PATENT DOCUMENTS

| | | |
|---|---|---|
| EP | 3722497 A1 | 10/2020 |
| EP | 3722498 A1 | 10/2020 |
| JP | 3-77201 B2 | 12/1991 |
| JP | 6-183939 A | 7/1994 |
| JP | 10-195772 A | 7/1998 |
| JP | 11-106401 A | 4/1999 |
| JP | 2000-80564 A | 3/2000 |
| JP | 2000-178303 A | 6/2000 |
| JP | 2000178303 A | 6/2000 |
| JP | 2001-181301 A | 7/2001 |
| JP | 2003-301376 A | 10/2003 |
| JP | 2004-519519 A | 7/2004 |
| JP | 2007-45991 A | 2/2007 |
| JP | 2007-145903 A | 6/2007 |
| JP | 2007145903 A | 6/2007 |
| JP | 2008-156764 A | 7/2008 |
| JP | 2008-535937 A | 9/2008 |
| JP | 2013-529644 A | 7/2013 |
| JP | 2014-169417 A | 9/2014 |
| JP | 2015-168666 A | 9/2015 |
| JP | 2015-227412 A | 12/2015 |
| JP | 2016-113724 A | 6/2016 |
| RU | 2479628 C2 | 4/2013 |
| RU | 2623909 C2 | 6/2017 |
| WO | WO-9829528 A2 | 7/1998 |
| WO | WO-2006094582 A1 | 9/2006 |
| WO | WO-2007120547 A1 | 10/2007 |
| WO | WO-2011121073 A1 | 10/2011 |
| WO | WO 2012/021626 A2 | 2/2012 |
| WO | WO 2013/068771 A1 | 5/2013 |
| WO | WO 2014/087968 A1 | 6/2014 |
| WO | WO 2016/077207 A1 | 5/2016 |
| WO | WO-2017142869 A1 | 8/2017 |

OTHER PUBLICATIONS

International Search Report for PCT/JP2018/044718 dated Jan. 15, 2019.
Extended European Search Report dated Aug. 4, 2021 in Patent Application No. 18885732.0, 8 pages.
Office Action dated Oct. 4, 2021 in co-pending U.S. Appl. No. 16/769,542, 8 pages.
Supplementary European Search Report dated Aug. 18, 2021 in Patent Application No. 18886039.9, 6 pages.
Extended European Search Report dated Jul. 26, 2021 in Patent Application No. 18885583.7.
Neda Beheshti et al, "Interaction behaviors in aqueous solutions of negatively and positively charged hydrophobically modified hydroxyethylcellulose in the presence of an anionic surfactant", Colloids and Surfaces A: Physiochemical and Engineering Aspects 328 2008 p. 79-89.
Sumei Yao (editor), Basic Chemistry (2nd Edition), Aug. 2017, p. 218, Ocean Press, Beijing, P. R. China.
Extended European Search Report dated Aug. 9, 2021 in Patent Application No. 18886444.1, 8 pages.
A.D. Alekseev et al, "Influence of Surfactants on Capacity of Low-Phosphatic Technical Detergents", Belarusian State Technological University, No. 2, 2017, pp. 159-163 (with English abstract).
Combined Office Action and Search Report dated Nov. 18, 2021 in Russian Patent Application No. 2020118530, 10 pages (with English translation).
Combined Office Action and Search Report dated Nov. 18, 2021 in Russian Patent Application No. 2020118531, 9 pages (with English translation).
V. M. Sutyagin et al, Khimiya i fizika polymerov: Uchebnoe posobie (Chemistry and Physics of Polymers: a Textbook).—Tomsk: TPU publishers, 2003, 6 pages.

* cited by examiner

POLYSACCHARIDE DERIVATIVE

FIELD OF THE INVENTION

The present invention relates to a polysaccharide derivative.

BACKGROUND OF THE INVENTION

A polysaccharide derivative is used as a blending component of cleaning compositions and the like, and its applications include many divergences.

For example, JP 2000-178303 A (PTL 1) describes, as an agent which is useful as a laundry finishing agent, a polysaccharide derivative in which a part or all of hydrogen atoms of hydroxy groups of a polysaccharide or a derivative thereof are substituted with the following groups (A), (B), and (C):

(A) A linear or branched alkyl group, alkenyl group, or acyl group each having 10 to 43 carbon atoms, in which hydroxy groups may be substituted, and an oxycarbonyl group (—COO— or —OCO—) or an ether bond may be inserted;

(B) A carboxymethyl group or its salt; and (C) A specified cationic group.

JP 2015-168666 (PTL 2) is aimed to provide an aqueous hair cleansing agent which is excellent in slipperiness of hair during washing and rinsing, and can give a moist feeling to hair after drying even if the damaged hair is, the aqueous hair cleansing agent containing the following components (A), (B), and (C) and water and having a pH of 2 or more and 6 or less at 25° C. when diluted 20 times with water:

(A) An anionic surfactant;

(B) A cationic group-containing cellulose ether having a main chain derived from anhydroglucose, in which a degree of substitution of a cationized oxyalkylene group per the anhydroglucose unit is 0.01 or more and 1.0 or less, a degree of substitution of a glycerol group is 0.5 or more and 5.0 or less, and a degree of substitution of a group containing a hydrocarbon group having 3 or more and 18 or less carbon atoms is 0 or more and 0.2 or less; and (C) A monoalkyl glyceryl ether or monoalkenyl glyceryl ether having an alkyl group or an alkenyl group each having 4 or more and 12 carbon atoms.

JP 2013-529644 A (PTL 3) discloses a personal care composition additive for providing prolonged benefit to a keratin surface, the personal care composition additive being composed of (a) a substantive polymer and (b) a water-miscible polar solvent, in which a solution of the substantive polymer and the water-miscible polar solvent is at a concentration of the substantive polymer to the solvent in a range of about 0.1% by mass to about 20% by mass; the substantive polymer has a molecular weight (Mw), as determined by size exclusion chromatography, in a range of greater than about 50 kDalton to less than or equal to about 800 kDalton; the substantive polymer has a cationic degree of substitution of greater than about 0.001 units; and the substantive polymer is selected from the group consisting of a polysaccharide and a synthetic polymer containing a cationic monomer.

US 2013/0130949 A (PTL 4) discloses that a high-molecular weight cellulose with thermal stability having a hydrophobic substituent and a cationic substituent or anionic substituent is used for a viscosity modifier of drilling agent or the like.

SUMMARY OF THE INVENTION

The present invention relates to the following <1> and <2>.

<1> A polysaccharide derivative having a cationic group and a hydrocarbon group (R) having 2 or more carbon atoms, wherein the hydrocarbon group (R) is bound to a group resulting from eliminating a hydrogen atom from a hydroxy group of a hydroxyalkylated polysaccharide, directly or via a hydrocarbon group having an oxygen atom; the hydroxyalkylated polysaccharide is a hydroxyethylated polysaccharide or a hydroxypropylated polysaccharide; and the hydroxyalkylated polysaccharide has a weight average molecular weight of 10,000 or more and 740,000 or less.

<2> A method for producing the polysaccharide derivative as set forth in <1>, including introducing a hydrocarbon group (R) having 2 or more carbon atoms into a hydroxyalkylated polysaccharide having a weight average molecular weight of 10,000 or more and 740,000 or less, followed by reacting with a cationizing agent.

DETAILED DESCRIPTION OF THE INVENTION

As a cleaning component for clothes, a cleaning component capable of not only suppressing strong attachment of a sebum soil, and enhancing cleaning properties against the sebum soil during cleaning, but also suppressing resoiling due to powder soil by carbon, etc. is demanded.

However, the conventional agents have not been able to exhibit a sufficient performance.

The present invention relates to a polysaccharide derivative capable of not only enhancing cleaning properties of sebum soil during washing but also suppressing resoiling due to powder soil during cleaning.

The present inventors have found that the aforementioned problem can be solved by a specified polysaccharide derivative.

In accordance with the present invention, a polysaccharide derivative capable of not only enhancing a cleaning performance of sebum soil during cleaning but also suppressing resoiling due to powder soil during cleaning is provided.

In the following description, the "cleaning performance" means a performance of suppressing strong attachment of sebum soil during use of clothes, etc. and enhancing a performance of removing sebum soil during cleaning, and the "resoiling preventing performance" means a performance of suppressing resoiling due to powder soil during cleaning.

[Polysaccharide Derivative]

The polysaccharide derivative of the present invention has a cationic group and a hydrocarbon group (R) having 2 or more carbon atoms (hereinafter also referred to as simply "hydrocarbon group (R)"). As for the polysaccharide derivative, the hydrocarbon group (R) is bound to a group resulting from eliminating a hydrogen atom from a hydroxy group of a hydroxyalkylated polysaccharide, directly or via a hydrocarbon group having an oxygen atom, the hydroxyalkylated polysaccharide is a hydroxyethylated polysaccharide or a hydroxypropylated polysaccharide, and the hydroxyalkylated polysaccharide has a weight average molecular weight of 10,000 or more and 740,000 or less.

The present inventors have found that when a cleaning agent composition or the like containing the polysaccharide derivative of the present invention is treated on a fabric, such as clothing, not only attachment of sebum soil is suppressed, but also resoiling due to powder soil during washing is suppressed. Although a detailed action mechanism thereof is not elucidated yet, it is partly estimated as follows.

In view of the fact that the polysaccharide derivative of the present invention has a cationic group, the polysaccharide derivative adsorbs on the fabric surface owing to an electrostatic interaction with an anionic group which the hydrophobic fiber has, an electrostatic interaction with an anionic surfactant adsorbed on the fabric surface in the case of treating clothing, etc. in the presence of the anionic surfactant, or other action. Furthermore, in view of the fact that the polysaccharide derivative of the present invention has a hydrocarbon group (R) having 2 or more carbon atoms, it adsorbs on the fabric surface due to a hydrophobic interaction particularly when the fabric is hydrophobic. In the light of the above, in view of the fact that the polysaccharide derivative of the present invention has the cationic group and the hydrocarbon group (R), adsorption properties onto the fabric are enhanced.

In view of the fact that the polysaccharide derivative of the present invention adsorbs onto the fabric surface, it may be considered that not only the fabric surface formed of a hydrophobic fiber is hydrophilized, but also oil repellency is enhanced. According to this, it may be considered that the strong attachment of sebum soil is suppressed.

In view of the fact that the weight average molecular weight of the polysaccharide derivative of the present invention is equal to or less than the specified amount, the resoiling against powder soil is suppressed, too. It may be estimated that this is caused due to the fact that since the polysaccharide derivative of the present invention more uniformly adsorbs onto the fiber surface, the cationic group which the polysaccharide derivative has is not localized, the cationic group is easy to cause an electrostatic action with the anionic group which the fiber has, whereby a free cationic group which does not participate in the electrostatic action is reduced, and an interaction with a negatively charged powder is reduced.

Although the polysaccharide derivative of the present invention is effective especially for a fabric formed of a hydrophobic fiber, it should be construed that the present invention is not limited thereto. In addition, though the fabric is preferably treated in the presence of an anionic surfactant, it should be construed that the present invention is not limited thereto. It has been confirmed that the polysaccharide derivative of the present invention also exhibits adsorption properties against the fabric even in the absence of an anionic surfactant.

<Hydroxyalkylated Polysaccharide>

In the polysaccharide derivative of the present invention, the cationic group and the hydrocarbon group (R) are bound to a hydroxyalkylated polysaccharide having a weight average molecular weight of 10,000 or more and 740,000 or less.

The hydroxyalkylated polysaccharide is a hydroxyethylated polysaccharide or a hydroxypropylated polysaccharide. The "hydroxyalkylated" means "monohydroxyalkylated".

Examples of the hydroxyalkylated polysaccharide which is used in the present invention include a polysaccharide, such as cellulose, guar gum, and starch, or a polysaccharide having a substituent, such as a methyl group, introduced into such a polysaccharide, further having at least one selected from a hydroxyethyl group and a hydroxypropyl group.

Examples of the hydroxyalkylated polysaccharide include hydroxyethyl cellulose, hydroxyethyl guar gum, hydroxyethyl starch, hydroxypropyl cellulose, hydroxypropyl guar gum, hydroxypropyl starch, hydroxyethylmethyl cellulose, hydroxyethylmethyl guar gum, hydroxyethylmethyl starch, hydroxypropylmethyl cellulose, hydroxypropylmethyl guar gum, and hydroxypropylmethyl starch.

The polysaccharide is preferably cellulose or guar gum, and more preferably cellulose.

The hydroxyalkylated polysaccharide is preferably hydroxyethyl cellulose or hydroxypropyl cellulose, and more preferably hydroxyethyl cellulose.

(Hydroxyalkyl Group)

In the present invention, as for the hydroxyalkylated polysaccharide, a hydroxyalkyl group is introduced into a polysaccharide. The hydroxyalkyl group is at least one selected from a hydroxyethyl group and a hydroxypropyl group. The hydroxyalkylated polysaccharide more preferably has only a hydroxyethyl group or a hydroxypropyl group, and still more preferably has only a hydroxyethyl group. The hydroxyalkylated polysaccharide may have both a hydroxyethyl group and a hydroxypropyl group, and it preferably has only either one of them, and more preferably has only a hydroxyethyl group.

From the viewpoint of solubility in water, a degree of substitution of the hydroxyalkyl group is preferably 0.1 or more, more preferably 0.5 or more, still more preferably 1 or more, and yet still more preferably 1.5 or more. From the viewpoint of cleaning performance, the degree of substitution of the hydroxyalkyl group is preferably 10 or less, more preferably 8 or less, still more preferably 5 or less, yet still more preferably 3 or less, and even yet still more preferably 2.5 or less.

From the viewpoint of solubility in water and the viewpoint of cleaning performance, the degree of substitution of the hydroxyalkyl group is preferably 0.1 or more and 10 or less, more preferably 0.5 or more and 8 or less, still more preferably 1 or more and 5 or less, yet still more preferably 1.5 or more and 3 or less, and even yet still more preferably 1.5 or more and 2.5 or less.

In the case where the hydroxyalkylated polysaccharide has only a hydroxyethyl group or a hydroxypropyl group, the degree of substitution of the hydroxyalkyl group refers to a degree of substitution of either one of the groups. Meanwhile, in the case where the hydroxyalkylated polysaccharide has both a hydroxyethyl group and a hydroxypropyl group, the degree of substitution of the hydroxyalkyl group refers to a sum total of the degree of substitution of the hydroxyethyl group and the degree of substitution of the hydroxypropyl group.

In the present invention, the degree of substitution of an X group is a molar average degree of substitution (MS) of the X group and means an average number of substituted moles of the X group per mol of the constituent monosaccharide unit constituting a main chain of a polysaccharide derivative or a polysaccharide. For example, in the case where the hydroxyalkylated polysaccharide is hydroxyethyl cellulose, the "degree of substitution of the hydroxyethyl group" means an average molar number of the hydroxyethyl group introduced (bound) per mol of the anhydroglucose unit.

Although the hydroxyalkylated polysaccharide of the present invention may have a glycerol group as a substituent, the cleaning performance is liable to be lowered due to introduction of the glycerol group. In consequence, from the viewpoint of obtaining a high cleaning performance, the degree of substitution of the glycerol group is preferably less than 0.5, more preferably less than 0.1, and still more preferably 0, namely the hydroxyalkylated polysaccharide does not have the glycerol group.

The hydroxyalkylated polysaccharide having a glycerol group is obtained by allowing a glycerolizing agent to act on a polysaccharide. Examples of the glycerolizing agent include glycidol; a 3-halo-1,2-propanediol, such as 3-chloro-1,2-propanediol and 3-bromo-1,2-propanediol; glycerin; and glycerin carbonate. Of these, glycidol is preferred from the standpoint that a salt is not formed as a by-product as well as the viewpoint of reactivity.

(Weight Average Molecular Weight)

In the present invention, from the viewpoint of enhancing the cleaning performance, the weight average molecular weight of the hydroxyalkylated polysaccharide is 10,000 or more, preferably 30,000 or more, more preferably 50,000 or more, still more preferably 70,000 or more, yet still more preferably 100,000 or more, and even yet still more preferably 130,000 or more.

From the viewpoint of resoiling preventing performance, the weight average molecular weight of the hydroxyalkylated polysaccharide is 740,000 or less, preferably 720,000 or less, more preferably 650,000 or less, still more preferably 600,000 or less, yet still more preferably 500,000 or less, even yet still more preferably 400,000 or less, even still more preferably 300,000 or less, and even still more further preferably 200,000 or less; and from the viewpoint of formulation fluidity, the weight average molecular weight of the hydroxyalkylated polysaccharide is preferably 190,000 or less, more preferably 180,000 or less, still more preferably 170,000 or less, and yet still more preferably 160,000 or less.

From the viewpoint of enhancement in cleaning performance and the viewpoint of resoiling preventing performance, the weight average molecular weight of the hydroxyalkylated polysaccharide is 10,000 or more and 740,000 or less, preferably 10,000 or more and 720,000 or less, more preferably 10,000 or more and 650,000 or less, still more preferably 30,000 or more and 600,000 or less, yet still more preferably 50,000 or more and 500,000 or less, even yet still more preferably 70,000 or more and 400,000 or less, even still more preferably 100,000 or more and 300,000 or less, and even still more further preferably 130,000 or more and 200,000 or less.

From the viewpoint of enhancement in cleaning performance and the viewpoint of formulation fluidity, the weight average molecular weight of the hydroxyalkylated polysaccharide is preferably 10,000 or more and 190,000 or less, more preferably 30,000 or more and 180,000 or less, still more preferably 50,000 or more and 170,000 or less, yet still more preferably 70,000 or more and 160,000 or less, and even yet still more preferably 130,000 or more and 160,000 or less.

In the present invention, from the viewpoint of enhancement in cleaning performance, the viewpoint of resoiling preventing performance, and the viewpoint of formulation fluidity, the weight average molecular weight of the hydroxyalkylated polysaccharide is 130,000 or more and 190,000 or less, more preferably 130,000 or more and 180,000 or less, still more preferably 130,000 or more and 170,000 or less, and yet still more preferably 130,000 or more and 160,000 or less.

The weight average molecular weight of the hydroxyalkylated polysaccharide is measured by the method described in the section of Examples. In addition, in the case where the hydroxyalkylated polysaccharide is procured as a product and provided for use, published values by a manufacturer may be adopted.

<Cationic Group>

In the polysaccharide derivative of the present invention, a cationic group is introduced into the aforementioned hydroxyalkylated polysaccharide. The cationic group as referred to herein means a quaternary ammonium salt, or a tertiary amine capable of being converted into a quaternary ammonium salt upon addition of a proton, and its quaternary ammonium salt (quaternary ammonium cation).

From the viewpoint of enhancement in cleaning performance, the degree of substitution ($MS_C$) of the cationic group is preferably 0.001 or more, more preferably 0.005 or more, still more preferably 0.01 or more, yet still more preferably 0.02 or more, even yet still more preferably 0.05 or more, and even still more preferably 0.07 or more.

From the viewpoint of resoiling preventing performance, the degree of substitution of the cationic group is preferably 1 or less, more preferably 0.5 or less, still more preferably 0.4 or less, yet still more preferably 0.35 or less, even yet still more preferably 0.3 or less, even still more preferably 0.25 or less, even still more further preferably 0.2 or less, and even yet still more further preferably 0.15 or less.

From the viewpoint of enhancement in cleaning performance and resoiling preventing performance, the degree of substitution ($MS_C$) of the cationic group is preferably 0.001 or more and 1 or less, more preferably 0.001 or more and 0.5 or less, still more preferably 0.001 or more and 0.4 or less, yet still more preferably 0.001 or more and 0.35 or less, even yet still more preferably 0.001 or more and 0.3 or less, even still more preferably 0.005 or more and 0.3 or less, even still further preferably 0.01 or more and 0.25 or less, even yet still more further preferably 0.02 or more and 0.2 or less, even yet still more further preferably 0.05 or more and 0.2 or less, and even yet still more further preferably 0.07 or more and 0.15 or less.

The degree of substitution of the cationic group can be measured by the method described in the section of Examples.

The cationic group introduced into the hydroxyalkylated polysaccharide is preferably represented by the following formula (2-1) or formula (2-2) as a whole.

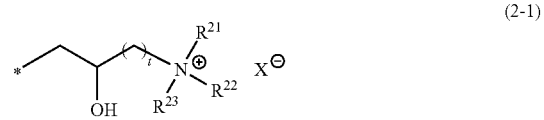

(2-1)

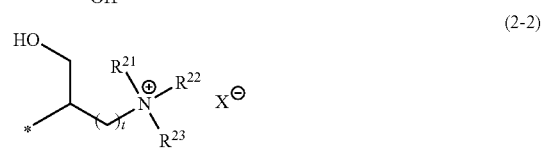

(2-2)

In the formula (2-1) and formula (2-2), $R^{21}$ to $R^{23}$ each independently represent a hydrocarbon group having 1 or more and 24 or less carbon atoms; $X^-$ represents an anion; t represents an integer of 0 or more and 3 or less; and * represents a binding position to a group resulting from eliminating a hydrogen atom from a hydroxy group of the hydroxyalkylated polysaccharide.

$R^{21}$ to $R^{23}$ each independently represent a hydrocarbon group having 1 or more and 24 or less carbon atoms, and preferably a linear or branched hydrocarbon group having 1 or more and 4 or less carbon atoms. Specifically, examples thereof include a methyl group, an ethyl group, a n-propyl group, an isopropyl group, a n-butyl group, a sec-butyl group, a tert-butyl group, and an isobutyl group. Of these, a methyl group or an ethyl group is preferred; and all of $R^{21}$ to $R^{23}$ are more preferably a methyl group or an ethyl group, and all of $R^{21}$ to $R^{23}$ are still more preferably a methyl group.

In the formula (2-1) and formula (2-2), t represents an integer of 0 or more and 3 or less, preferably an integer of 1 or more and 3 or less, more preferably 1 or 2, and still more preferably 1.

$X^-$ represents an anion and is a counter ion of the quaternary ammonium cation. Specifically, examples thereof include an alkyl sulfate ion having 1 or more and 3 or less carbon atoms, a sulfate ion, a phosphate ion, a carboxylate ion having 1 or more and 3 or less carbon atoms (e.g., a formate ion, an acetate ion, and a propionate ion), and a halide ion.

Of these, from the viewpoint of easiness of production and easiness of raw material availability, $X^-$ is preferably at least one selected from an alkyl sulfate ion having 1 or more and 3 or less carbon atoms, a sulfate ion, and a halide ion, and more preferably a halide ion. Examples of the halide ion include a fluoride ion, a chloride ion, a bromide ion, and an iodide ion. From the viewpoint of solubility in water and chemical stability of the resulting polysaccharide derivative, the halide ion is preferably at least one selected from a chloride ion and a bromide ion, and more preferably a chloride ion.

$X^-$ may be used alone or in combination of two or more thereof.

<Hydrocarbon Group (R)>

In the polysaccharide derivative of the present invention, the hydrocarbon group (R) is introduced into the hydroxyalkylated polysaccharide.

From the viewpoint of enhancement in cleaning performance, a degree of substitution ($MS_R$) of the hydrocarbon group (R) in the polysaccharide derivative of the present invention is preferably 0.001 or more, more preferably 0.003 or more, still more preferably 0.005 or more, yet still more preferably 0.08 or more, even yet still more preferably 0.01 or more, and even still more preferably 0.015 or more. From the viewpoint of solubility in water, the degree of substitution ($MS_R$) of the hydrocarbon group (R) in the polysaccharide derivative of the present invention is preferably 1 or less, more preferably 0.5 or less, still more preferably 0.3 or less, yet still more preferably 0.1 or less, even yet still more preferably 0.08 or less, even still more preferably 0.06 or less, even still more further preferably 0.05 or less, even yet still more further preferably 0.04 or less, and even yet still more further preferably 0.03 or less.

From the viewpoint of enhancement in cleaning performance and the viewpoint of solubility in water, the degree of substitution ($MS_R$) of the hydrocarbon group (R) is preferably 0.001 or more and 1 or less, more preferably 0.001 or more and 0.5 or less, still more preferably 0.001 or more and 0.3 or less, yet still more preferably 0.001 or more and 0.1 or less, even yet still more preferably 0.001 or more and 0.05 or less, even still more preferably 0.003 or more and 0.05 or less, even still more further preferably 0.003 or more and 0.04 or less, even yet still more further preferably 0.005 or more and 0.04 or less, even yet still more further preferably 0.005 or more and 0.03 or less, even yet still more further preferably 0.008 or more and 0.03 or less, even yet still more further preferably 0.01 or more and 0.03 or less, and even yet still more further preferably 0.015 or more and 0.03 or less.

In the present invention, the hydrocarbon group (R) is preferably an aliphatic hydrocarbon group. Although the aliphatic hydrocarbon group may be either a saturated aliphatic hydrocarbon group or an unsaturated aliphatic hydrocarbon group, it is more preferably a saturated aliphatic hydrocarbon group, still more preferably a linear or branched alkyl group, and yet still more preferably a linear alkyl group.

A preferred combination of the degree of substitution ($MS_C$) of the cationic group and the degree of substitution ($MS_R$) of the hydrocarbon group (R) is as follows.

Preferably, not only the degree of substitution ($MS_C$) of the cationic group is 0.001 or more and 1 or less, but also the degree of substitution ($MS_R$) of the hydrocarbon group (R) is 0.001 or more and 1 or less; more preferably, not only the degree of substitution ($MS_C$) of the cationic group is 0.001 or more and 0.5 or less, but also the degree of substitution ($MS_R$) of the hydrocarbon group (R) is 0.001 or more and 0.3 or less; still more preferably, not only the degree of substitution ($MS_C$) of the cationic group is 0.001 or more and 0.4 or less, but also the degree of substitution ($MS_R$) of the hydrocarbon group (R) is 0.001 or more and 0.1 or less; yet still more preferably, not only the degree of substitution ($MS_C$) of the cationic group is 0.001 or more and 0.4 or less, but also the degree of substitution ($MS_R$) of the hydrocarbon group (R) is 0.001 or more and 0.05 or less; even yet still more preferably, not only the degree of substitution ($MS_C$) of the cationic group is 0.005 or more and 0.3 or less, but also the degree of substitution ($MS_R$) of the hydrocarbon group (R) is 0.003 or more and 0.04 or less; even still more preferably, not only the degree of substitution ($MS_C$) of the cationic group is 0.02 or more and 0.2 or less, but also the degree of substitution ($MS_R$) of the hydrocarbon group (R) is 0.008 or more and 0.03 or less; and even still further preferably, not only the degree of substitution ($MS_C$) of the cationic group is 0.07 or more and 0.15 or less, but also the degree of substitution ($MS_R$) of the hydrocarbon group (R) is 0.015 or more and 0.03 or less.

From the viewpoint of enhancement in cleaning performance, the carbon number of the hydrocarbon group (R) is 2 or more, preferably 4 or more, more preferably 6 or more, still more preferably 8 or more, and yet still more preferably 10 or more. From the viewpoint of enhancement in cleaning performance, the carbon number of the hydrocarbon group (R) is preferably 22 or less, more preferably 18 or less, still more preferably 16 or less, yet still more preferably 15 or less, and even yet still more preferably 14 or less.

From the viewpoint of enhancement in cleaning performance, the carbon number of the hydrocarbon group (R) is preferably 2 or more and 22 or less, more preferably 4 or more and 22 or less, still more preferably 4 or more and 18 or less, yet still more preferably 6 or more and 16 or less, even yet still more preferably 8 or more and 16 or less, even still more preferably 8 or more and 15 or less, even still more further preferably 8 or more and 14 or less, and even yet still more further preferably 10 or more and 14 or less.

In the degree of substitution ($MS_R$) of the hydrocarbon group (R) having 2 or more carbon atoms, from the viewpoint of enhancement in cleaning performance, a degree of substitution ($MS_{9R}$) of the hydrocarbon group (R) having 9 or more carbon atoms ($MS_{9R}/MS_R$) is preferably 0.25 or more and 1 or less, more preferably 0.5 or more and 1 or less, and still more preferably 0.9 or more and 1 or less, and it may also be 1.

In the present invention, the hydrocarbon group (R) is bound to a group resulting from eliminating a hydrogen atom from a hydroxy group of the hydroxyalkylated polysaccharide, directly or via a hydrocarbon group having an oxygen atom.

That is, it is preferred that the hydrocarbon group (R) is bound to a group resulting from eliminating a hydrogen atom from a hydroxy group of the hydroxyalkylated polysaccharide, via a connecting group Z represented by the following formula (1).

$$*-Z-R \quad (1)$$

In the formula (1), Z represents a single bond or a divalent hydrocarbon group having an oxygen atom; R represents a hydrocarbon group having 2 or more carbon atoms; and * represents a binding position to a group resulting from eliminating a hydrogen atom from a hydroxy group of the hydroxyalkylated polysaccharide.

Z represents a single bond or a divalent hydrocarbon group having an oxygen atom. Here, the aforementioned hydrocarbon group is preferably an alkylene group; a methylene group of a part of the alkylene group may be substituted with an ether bond or carbonyl carbon (—C(=O)—); and a hydrogen atom of a part of the alkylene group may be substituted with a hydroxy group, an alkyl group, or a hydroxyalkyl group. The divalent hydrocarbon group having an oxygen atom preferably contains an ester group and/or an ether group, and more preferably contains an ether group. Here, in the case where Z is a divalent hydrocarbon group having an oxygen atom, Z is constituted of only a carbon atom, a hydrogen atom, and an oxygen atom, and for example, it does not contain a nitrogen atom.

In the case where Z is a divalent hydrocarbon group having an oxygen atom (hereinafter also referred to as "hydrocarbon group (Z)"), the hydrocarbon group (Z) preferably has an epoxy group-derived group or an oxyglycidyl group-derived group, and from the viewpoint of cleaning performance, the hydrocarbon group (Z) more preferably has an oxyglycidyl group-derived group. In the case where Z is a divalent hydrocarbon group having an oxygen atom, the carbon number of the hydrocarbon group is preferably 1 or more and 6 or less, and more preferably 1 or more and 3 or less.

R is defined such that the carbon number of the hydrocarbon group becomes maximum. In consequence, the atom in Z bound to R in the formula (1) is, for example, an oxygen atom, a carbonate carbon, a carbon atom on which a hydroxy group is substituted, or a carbon atom on which a hydroxyalkyl group is substituted.

In the formula (1), R represents a hydrocarbon group having 2 or more carbon atoms, and preferably an aliphatic hydrocarbon group. Although the aliphatic hydrocarbon group may be either a saturated aliphatic hydrocarbon group or an unsaturated aliphatic hydrocarbon group, it is more preferably a saturated aliphatic hydrocarbon group, still more preferably a linear or branched alkyl group, and yet still more preferably a linear alkyl group.

In the formula (1), from the viewpoint of enhancement in cleaning performance, the carbon number of R is 2 or more, preferably 4 or more, more preferably 6 or more, still more preferably 8 or more, and yet still more preferably 10 or more. From the viewpoint of enhancement in cleaning performance, the carbon number of R is preferably 22 or less, more preferably 18 or less, still more preferably 16 or less, yet still more preferably 15 or less, and even yet still more preferably 14 or less.

The group represented by the formula (1) is more preferably any one of groups represented by the following formulae (1-1-1) to (1-4).

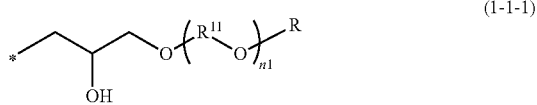

(1-1-1)

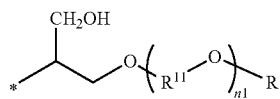

(1-1-2)

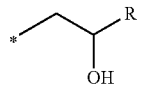

(1-2-1)

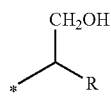

(1-2-2)

*——R (1-3)

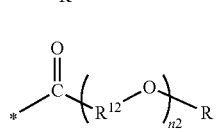

(1-4)

In the formula (1-1-1) to formula (1-4), $R^{11}$ and $R^{12}$ each independently represent an alkylene group having 2 to 4 carbon atoms; R represents a hydrocarbon group having 2 or more carbon atoms; * represents a binding position to a group resulting from eliminating a hydrogen atom from a hydroxy group of the hydroxyalkylated polysaccharide; n1 represents an average addition molar number of —$R^{11}$—O—; n2 represents an average addition molar number of —$R^{12}$—O—; and n1 and n2 are each 0 or more and 30 or less.

In the formula (1-1-1) to formula (1-4), R is synonymous with R in the formula (1), and a preferred embodiment thereof is also the same. Z in the formula (1) is a group resulting from eliminating R from each of the formula (1-1-1) to formula (1-4).

In the formula (1-1-1) to formula (1-4), $R^{11}$ and $R^{12}$ each independently represent an alkylene group having 2 to 4 carbon atoms, and preferably an alkylene group having 2 or 3 carbon atoms, namely an ethylene group or a propylene group. In the case where a plurality of each of $R^{11}$ and $R^{12}$ exist, they may be the same as or different from each other, respectively. n1 and n2 are each 0 or more and 30 or less, preferably 0 or more and 20 or less, more preferably 0 or more and 10 or less, and still more preferably 0 or more and 5 or less, and they may also be 0.

The formula (1-1-1) and formula (1-1-2) are each group derived from a glycidyl ((poly)alkyleneoxy)hydrocarbyl ether, and Z in the formula (1) is a group derived from an oxyglycidyl group or a (poly)alkyleneoxyglycidyl group. The group represented by the formula (1-1-1) or formula (1-1-2) is obtained by using, as an introducing agent (hereinafter also referred to as "hydrophobizing agent") of the hydrocarbon group (R), a glycidyl ((poly)alkyleneoxy)hydrocarbyl ether, preferably a glycidyl ((poly)alkyleneoxy) alkyl ether, and more preferably a glycidyl alkyl ether.

The formula (1-2-1) and formula (1-2-2) are each a group in which Z in the formula (1) is derived from an epoxy group. The group represented by each of the formula (1-2-1) and formula (1-2-2) is obtained by using, as an introducing agent of the hydrocarbon group (R), a terminal-epoxidized hydrocarbon, and preferably a terminal-epoxidized alkane.

Furthermore, the formula (1-3) is the case where the hydrocarbon group (R) is bound directly to a group resulting from eliminating a hydrogen atom from a hydroxy group of the hydroxyalkylated polysaccharide. The group represented by the formula (1-3) is obtained by using, as a hydrophobizing agent, a halogenated hydrocarbon.

The formula (1-4) contains a group in which Z is derived from a carboxy group or the like. The group represented by the formula (1-4) is obtained by using, as an introducing agent of the hydrocarbon group (R), R—(O—R$^{12}$)$_{n2}$—C(=O)—OH, R—(O—R$^{12}$)$_{n2}$—C(=O)-A (A represents a halogen atom), R—(O—R$^{12}$)$_{n2}$—C(=O)—O—C(=O)—(R$^{12}$—O)$_{n2}$—R, or the like.

Of these, from the standpoint that a salt is not formed as a by-product during synthesis of the polysaccharide derivative as well as the viewpoint of cleaning performance, the group represented by the formula (1) is preferably the group represented by the formula (1-1-1), formula (1-1-2), formula (1-2-1), or formula (1-2-2), and more preferably the group represented by the formula (1-1-1) or formula (1-1-2).

In the present invention, from the viewpoint of cleaning performance and resoiling preventing performance, a ratio (MS$_R$/MS$_C$) of the degree of substitution (MS$_R$) of the hydrocarbon group (R) to the degree of substitution (MS$_C$) of the cationic group in the polysaccharide derivative is preferably 0.001 or more, more preferably 0.005 or more, still more preferably 0.01 or more, and yet still more preferably 0.05 or more, and from the same viewpoint, the ratio (MS$_R$/MS$_C$) is preferably 1 or less, more preferably 0.8 or less, still more preferably 0.6 or less, yet still more preferably 0.5 or less, and even yet still more preferably 0.3 or less.

From the viewpoint of cleaning performance and resoiling preventing performance, the ratio (MS$_R$/MS$_C$) of the degree of substitution (MS$_R$) of the hydrocarbon group (R) to the degree of substitution (MS$_C$) of the cationic group in the polysaccharide derivative is preferably 0.001 or more and 1 or less, more preferably 0.005 or more and 0.8 or less, still more preferably 0.005 or more and 0.6 or less, yet still more preferably 0.01 or more and 0.5 or less, even yet still more preferably 0.05 or more and 0.5 or less, and even still more preferably 0.05 or more and 0.3 or less.

In the present invention, from the viewpoint of cleaning performance and resoiling preventing performance, it is preferred that the hydrocarbon group (R) and the cationic group are bound to an oxygen atom of a different hydroxy group which the hydroxyalkylated polysaccharide has. That is, it is preferred that the polysaccharide derivative is not a polysaccharide derivative having the hydrocarbon group (R) and the cationic group on one side chain. It is preferred that the hydrocarbon group (R) and the cationic group are bound on a different side chain of the polysaccharide derivative.

In the present invention, though the polysaccharide derivative may have an anionic group, from the viewpoint of cleaning performance, a ratio (MS$_A$/MS$_C$) of the degree of substitution (MS$_A$) of the anionic group to the degree of substitution (MS$_C$) of the cationic group in the polysaccharide derivative is preferably 3 or less, more preferably 2 or less, still more preferably 1.7 or less, yet still more preferably 1.5 or less, even yet still more preferably 1 or less, even still more preferably 0.5 or less, and even still more further preferably 0.1 or less, and it may be 0 or more, and even yet still more further preferably 0.

From the viewpoint of cleaning performance, the degree of substitution (MS$_A$) of the anionic group in the polysaccharide derivative is preferably 0.3 or less, more preferably 0.1 or less, still more preferably 0.03 or less, yet still more preferably less than 0.01, and even yet still more preferably 0.001 or less, and it may be 0 or more, and even still more preferably 0.

In the case where the polysaccharide derivative has the anionic group, examples of the anionic group include a sulfate ester group, a sulfonic acid group, and a carboxymethyl group.

The carboxymethylation reaction (introduction reaction of carboxymethyl group) is performed by allowing the hydroxyalkylated polysaccharide to react with a monohalogenated acetic acid and/or its metal salt in the presence of a basic compound.

Specifically, examples of the monohalogenated acetic acid and the monohalogenated acetic acid metal salt include monochloroacetic acid, sodium monochloroacetate, potassium monochloroacetate, sodium monobromoacetate, and potassium monobromoacetate. Such a monohalogenated acetic acid and its metal salt can be used either alone or in combination of two or more thereof.

A preferred combination of the ratio (MS$_R$/MS$_C$) of the degree of substitution (MS$_R$) of the hydrocarbon group (R) to the degree of substitution (MS$_C$) of the cationic group and the ratio (MS$_A$/MS$_C$) of the degree of substitution (MS$_A$) of the anionic group to the degree of substitution (MS$_C$) of the cationic group in the polysaccharide derivative is as follows.

Preferably, not only the ratio (MS$_R$/MS$_C$) of the degree of substitution (MS$_R$) of the hydrocarbon group (R) to the degree of substitution (MS$_C$) of the cationic group in the polysaccharide derivative is 0.001 or more and 1 or less, but also the ratio (MS$_A$/MS$_C$) of the degree of substitution (MS$_A$) of the anionic group to the degree of substitution (MS$_C$) of the cationic group is 3 or less; more preferably, not only the (MS$_R$/MS$_C$) is 0.005 or more and 0.8 or less, but also the (MS$_A$/MS$_C$) is 1.5 or less; still more preferably, not only the (MS$_R$/MS$_C$) is 0.005 or more and 0.6 or less, but also the (MS$_A$/MS$_C$) is 1 or less; yet still more preferably, not only the (MS$_R$/MS$_C$) is 0.05 or more and 0.5 or less, but also the (MS$_A$/MS$_C$) is 0.5 or less; and even yet still more preferably, not only the (MS$_R$/MS$_C$) is 0.05 or more and 0.3 or less, but also the (MS$_A$/MS$_C$) is 0.3 or less.

From the foregoing viewpoint, preferably, the degree of substitution (MS$_C$) of the cationic group is 0.001 or more and 1 or less, the degree of substitution (MS$_R$) of the hydrocarbon group is 0.001 or more and 1 or less, the ratio (MS$_R$/MS$_C$) of the degree of substitution (MS$_R$) of the hydrocarbon group (R) to the degree of substitution (MS$_C$) of the cationic group is 0.001 or more and 1 or less, and the ratio (MS$_A$/MS$_C$) of the degree of substitution (MS$_A$) of the anionic group to the degree of substitution (MS$_C$) of the cationic group is 3 or less;

more preferably, the degree of substitution (MS$_C$) of the cationic group is 0.001 or more and 0.5 or less, the degree of substitution (MS$_R$) of the hydrocarbon group is 0.001 or more and 0.3 or less, the ratio (MS$_R$/MS$_C$) of the degree of substitution (MS$_R$) of the hydrocarbon group (R) to the degree of substitution (MS$_C$) of the cationic group is 0.005 or more and 0.8 or less, and the ratio (MS$_A$/MS$_C$) of the degree of substitution (MS$_A$) of the anionic group to the degree of substitution (MS$_C$) of the cationic group is 1.5 or less;

still more preferably, the degree of substitution (MS$_C$) of the cationic group is 0.001 or more and 0.4 or less, the degree of substitution (MS$_R$) of the hydrocarbon group is 0.001 or more and 0.1 or less, the ratio (MS$_R$/MS$_C$) of the degree of substitution (MS$_R$) of the hydrocarbon group (R) to the degree of substitution (MS$_C$) of the cationic group is 0.005 or more and 0.6 or less, and the ratio (MS$_A$/MS$_C$) of the degree of substitution (MS$_A$) of the anionic group to the degree of substitution (MS$_C$) of the cationic group is 1 or less; and yet still more preferably, the degree of substitution ($MS_C$) of the cationic group is 0.005 or more and 0.3 or less, the degree of substitution ($MS_R$) of the hydrocarbon group (R) is 0.003 or more and 0.04 or less, the ratio ($MS_R/MS_C$) of the degree of substitution ($MS_R$) of the hydrocarbon group (R) to the degree of substitution ($MS_C$) of the cationic group is 0.05 or more and 0.5 or less, and the ratio ($MS_A/MS_C$) of the degree of substitution ($MS_A$) of the anionic group to the degree of substitution ($MS_C$) of the cationic group is 0.5 or less.

A preferred embodiment of the polysaccharide derivative of the present invention is a polysaccharide derivative having a cationic group and a hydrocarbon group (R) having 4 or more and 15 or less carbon atoms, the polysaccharide derivative being a polysaccharide derivative having a degree of substitution ($MS_C$) of the cationic group of 0.001 or more and 0.4 or less and a degree of substitution ($MS_R$) of the hydrocarbon group of 0.001 or more and 0.05 or less, wherein the hydrocarbon group (R) is bound to a group resulting from eliminating a hydrogen atom from a hydroxy group of a hydroxyalkylated polysaccharide, directly or via a hydrocarbon group optionally having an oxygen atom; the hydroxyalkylated polysaccharide is a hydroxyethylated polysaccharide or a hydroxypropylated polysaccharide; and the hydroxyalkylated polysaccharide has a weight average molecular weight of 10,000 or more and 740,000 or less.

Another preferred embodiment of the polysaccharide derivative of the present invention is a polysaccharide derivative having a cationic group and a hydrocarbon group (R), the polysaccharide derivative being a polysaccharide derivative in which the hydrocarbon group (R) is bound to a group resulting from eliminating a hydrogen atom from a hydroxy group of a hydroxyalkylated polysaccharide via a connecting group containing an ether group, wherein the hydroxyalkylated polysaccharide is a hydroxyethylated polysaccharide or a hydroxypropylated polysaccharide; and the hydroxyalkylated polysaccharide has a weight average molecular weight of 10,000 or more and 740,000 or less.

A still another preferred embodiment of the polysaccharide derivative of the present invention is a polysaccharide derivative having a cationic group and a hydrocarbon group (R) having 2 or more carbon atoms, wherein the hydrocarbon group (R) is bound to a group resulting from eliminating a hydrogen atom from a hydroxy group of a hydroxyalkylated polysaccharide, directly or via a connecting group (exclusive of the cationic group); and the hydroxyalkylated polysaccharide has a weight average molecular weight of 10,000 or more and 190,000 or less. Here, the connecting group (exclusive of the cationic group) includes the aforementioned hydrocarbon group having an oxygen atom, an amide group, and a urea group.

<Application>

In accordance with the polysaccharide derivative of the present invention, when treating a fabric, such as clothing, not only it is able to suppress strong attachment of an oily soil, such as a sebum soil, against the fabric and to enhance cleaning properties against the sebum soil during washing, but also it is able to suppress resoiling to be caused when a powder, such as carbon, reattaches to the fabric during washing.

It is preferred to add the polysaccharide derivative of the present invention to a cleaning agent composition for clothing. By treating a clothing in advance before wearing, it can be expected that strong attachment of a sebum soil is suppressed during use, such as the time of wearing, is suppressed, and cleaning properties of the sebum soil during washing are enhanced. As for the cleaning agent composition for clothing, the polysaccharide derivative of the present invention may be contained as a constituent component thereof, or may be added separately, without being particularly limited.

From the viewpoint of cleaning performance and resoiling preventing performance, the concentration of the polysaccharide derivative of the present invention in an aqueous solution on treating a fabric, such as clothing, is preferably 0.01 mg/L or more, more preferably 0.1 mg/L or more, still more preferably 0.3 mg/L or more, and yet still more preferably 0.5 mg/L or more, and from the viewpoint of economy, the concentration of the polysaccharide derivative of the present invention is preferably 10,000 mg/L or less, more preferably 1,000 mg/L or less, still more preferably 500 mg/L or less, and yet still more preferably 100 mg/L or less.

[Production Method of Polysaccharide Derivative]

<Hydroxyalkylated Polysaccharide>

The hydroxyalkylated polysaccharide is obtained by allowing a polysaccharide and a hydroxyalkylating agent to react with each other in the presence of a basic compound.

The case where the polysaccharide is cellulose is hereunder described as an example, but it should be construed that the present invention is not limited thereto. In general, the cellulose is high in crystallinity and poor in reactivity, and therefore, it is preferred to perform the treating by lowering the crystallinity before the reaction, thereby improving the reactivity.

Examples of a production method of a hydroxyalkylated cellulose include the following methods (i) to (iii).

Method (i): An activation method which is generally called acetylation or mercerization, namely, a method in which a raw material cellulose, a large quantity of water, and a large excess of an alkali metal hydroxide are mixed to obtain an alkali cellulose, which is then allowed to react with a hydroxyalkylating agent.

Method (ii): A method in which a raw material cellulose is dissolved in a solvent, for example, dimethyl sulfoxide containing tetrabutylammonium fluoride, dimethyl sulfoxide containing paraformaldehyde, and dimethylacetamide containing lithium chloride, or a solvent capable of dissolving cellulose therein, as described in "Cellulose Dictionary", edited by the Cellulose Society of Japan, published by Asakura Publishing, "Macromol. Chem. Phys. 201", 627-631 (2000), or the like, and the raw material is then allowed to react with a hydroxyalkylating agent.

Method (iii): A method in which a powdery or floc-like raw material cellulose is allowed to react with a hydroxyalkylating agent in the coexistence of an alkali, without using any excess alkali or specific solvent capable of dissolving cellulose therein, as in the aforementioned methods (i) and (ii).

The hydroxyalkylating agent, the cationizing agent, the hydrophobizing agent, and the activation method, which are adopted for the raw material of the polysaccharide derivatives, are hereunder described.

(Hydroxyalkylating Agent)

Specific examples of the hydroxyalkylating agent which is used for production of the polysaccharide derivative of the present invention include an epoxy alkane, an alkyl glycidyl ether, and an alkylhalohydrin ether. Of these, from the viewpoint that a salt is not formed during the reaction, at least one selected from an epoxy alkane and an alkyl glycidyl ether is preferred, and an epoxy alkane is more preferred.

The hydroxyalkylating agent is preferably at least one selected from ethylene oxide and propylene oxide, and more preferably ethylene oxide.

The hydroxyalkylated polysaccharide is commercially available, and hydroxyalkylated polysaccharides which are procured from the market may be used.

Specifically, examples of the hydroxyethyl cellulose include Natrosol Series (manufactured by Ashland Inc.). In addition, the hydroxyethyl cellulose and the hydroxypropyl cellulose are also available from Shin-Etsu Chemical Co., Ltd., The Dow Chemical Company, Nippon Soda Co., Ltd., Sumitomo Seika Chemicals Co., Ltd., Sansho Co., Ltd., Daicel FineChem Ltd., Tokyo Chemical Industry Co., Ltd., and so on.

<Cationizing Agent>

Examples of the cationizing agent which is used for production of the polysaccharide derivative of the present invention include compounds represented by the following formula (3) or formula (4).

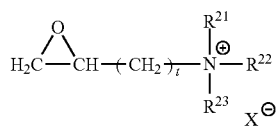

(3)

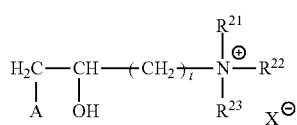

(4)

In the formulae (3) and (4), $R^{21}$ to $R^{23}$ and preferred embodiments thereof are the same as those for $R^{21}$ to $R^{23}$ in the formulae (2-1) and (2-2). t and a preferred embodiment thereof are the same as those for t in the formulae (2-1) and (2-2). $X^-$ and a preferred embodiment thereof are the same as those for $X^-$ in the formulae (2-1) and (2-2). A represents a halogen atom. $R^{21}$ to $R^{23}$ are the same as or different from each other.

Specific examples of the compound represented by the formula (3) or (4) include a chloride, a bromide, or an iodide of each of glycidyltrimethylammonium, glycidyltriethylammonium, and glycidyltripropylammonium; a chloride of each of 3-chloro-2-hydroxypropyltrimethylammonium, 3-chloro-2-hydroxypropyltriethylammonium, and 3-chloro-2-hydroxypropyltripropylammonium; a bromide of each of 3-bromo-2-hydroxypropyltrimethylammonium, 3-bromo-2-hydroxypropyltriethylammonium, and 3-bromo-2-hydroxypropyltripropylammonium; and an iodide of each of 3-iodo-2-hydroxypropyltrimethylammonium, 3-iodo-2-hydrxoypropyltriethylammonium, and 3-iodo-2-hydroxypropyltripropylammonium.

Of these, from the viewpoint of easiness of raw material availability and chemical stability, at least one selected from a chloride or a bromide of glycidyltrimethylammonium or glycidyltriethylammonium; a chloride of 3-chloro-2-hydroxypropyltrimethylammonium or 3-chloro-2-hydroxypropyltriethylammonium; and a bromide of 3-bromo-2-hydroxypropyltrimethylammonium or 3-bromo-2-hydroxypropyltriethylammonium is preferred; at least one selected from glycidyltrimethylammonium chloride and 3-chloro-2-hydroxypropyltrimethylammonium chloride is more preferred; and glycidyltrimethylammonium chloride is still more preferred.

These cationizing agents can be used either alone or in combination of two or more thereof.

Although the amount of the cationizing agent to be used may be appropriately selected taking into consideration the desired degree of substitution ($MS_C$) of the cationic group and the reaction yield, from the viewpoint of solubility in water of the polysaccharide derivative and obtaining the effects of the present invention, it is preferably 0.01 mol or more, more preferably 0.03 mol or more, still more preferably 0.05 mol or more, and yet still more preferably 0.1 mol or more per mol of the constituent monosaccharide unit of the hydroxyalkylated polysaccharide, and from the aforementioned viewpoint and the viewpoint of production cost of the polysaccharide derivative, it is preferably 30 mol or less, more preferably 25 mol or less, still more preferably 10 mol or less, yet still more preferably 1 mol or less, and even yet still more preferably 0.5 mol or less.

The addition method of the cationizing agent may be any of batch, intermittent, and continuous methods.

<Introducing Agent of Hydrocarbon Group (R)>

As the introducing agent (hydrophobizing agent) of the hydrocarbon group (R) which is used for production of the polysaccharide derivative of the present invention, any agents capable of introducing the group represented by the formula (1) may be used.

Examples of the introducing agent capable of introducing the group represented by each of the formula (1-1-1) and formula (1-1-2) include compounds represented by the following formula (5) or (6).

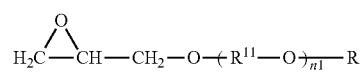

(5)

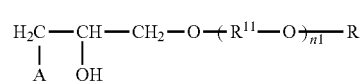

(6)

In the formulae (5) and (6), R and a preferred embodiment thereof are the same as those for R in the formula (1). A represents a halogen atom, and preferably a chlorine atom. $R^{11}$ and a preferred embodiment thereof are the same as $R^{11}$ and a preferred embodiment thereof in the formulae (1-1-1) and (1-1-2). In addition, n1 and a preferred embodiment thereof are the same as n1 and a preferred embodiment thereof in the formulae (1-1-1) and (1-1-2).

Specific examples of the compound represented by the formula (5) include glycidyl ethers having an alkyl group, such as ethyl glycidyl ether, propyl glycidyl ether, butyl glycidyl ether, pentyl glycidyl ether, hexyl glycidyl ether, heptyl glycidyl ether, octyl glycidyl ether, nonyl glycidyl ether, decyl glycidyl ether, undecyl glycidyl ether, dodecyl glycidyl ether, tridecyl glycidyl ether, tetradecyl glycidyl ether, pentadecyl glycidyl ether, hexadecyl glycidyl ether, heptadecyl glycidyl ether, and octadecyl glycidyl ether; and glycidyl ethers having an alkenyl group, such as butenyl glycidyl ether, pentenyl glycidyl ether, hexenyl glycidyl ether, heptenyl glycidyl ether, octenyl glycidyl ether, nonenyl glycidyl ether, decenyl glycidyl ether, undecenyl glycidyl ether, dodecenyl glycidyl ether, tridecenyl glycidyl ether, tetradecenyl glycidyl ether, pentadecenyl glycidyl ether, hexadecenyl glycidyl ether, heptadecenyl glycidyl ether, and octadecenyl glycidyl ether. Of these, alkyl glycidyl ethers having a hydrocarbon group and having 5 or more and 25 or less carbon atoms, such as lauryl glycidyl ether and cetyl glycidyl ether, are preferred.

Specific examples of the compound represented by the formula (6) include 3-halo-2-hydroxy-propylalkyl ethers having a hydrocarbon group and having 5 or more and 25 or less carbon atoms, such as 3-chloro-2-hydroxypropyl-dodecyl ether.

Of these, the compound represented by the formula (5) is preferred from the standpoint that a salt is not formed as a by-product during the reaction between the hydrophobizing agent and the hydroxyalkylated polysaccharide as well as the viewpoint of easiness of availability of the hydrophobizing agent and chemical stability.

These can be used either alone or in combination of two or more thereof.

Examples of the introducing agent capable of introducing the group represented by each of the formula (1-2-1) and formula (1-2-2) include compounds represented by the following formula (7) or (8).

  (7)

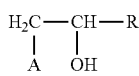  (8)

In the formulae (7) and (8), R and a preferred embodiment thereof are the same as those for R in the formula (1). A represents a halogen atom, and preferably a chlorine atom.

Specific examples of the compound represented by the formula (7) include 1,2-epoxyalkanes having a hydrocarbon group and having 4 or more and 24 or less carbon atoms, such as 1,2-epoxyhexane, 1,2-epoxyheptane, 1,2-epoxytetradecane, and 1,2-epoxyoctadecane. Specific examples of the compound represented by the formula (8) include 1-halo-2-hydroxyalkanes having a hydrocarbon group and having 4 or more and 24 or less carbon atoms, such as 1-chloro-2-hydroxytetradecane.

Of these, the compound represented by the formula (7) is preferred from the standpoint that a salt is not formed as a by-product during the reaction between the hydrophobizing agent and the hydroxyalkylated polysaccharide as well as the viewpoint of easiness of availability of the hydrophobizing agent and chemical stability.

These can be used either alone or in combination of two or more thereof.

Examples of the hydrophobizing agent capable of introducing the group represented by the formula (1-3) include compounds represented by the following formula (9).

A-R  (9)

In the formula (9), R and a preferred embodiment thereof are the same as those for R in the formula (1). A represents a halogen atom, and preferably a chlorine atom.

Specific examples of the compound represented by the formula (9) include halogenated alkanes having the aforementioned desired carbon number.

Examples of the hydrophobizing agent capable of introducing the group represented by the formula (1-4) include compounds represented by the following formulae (10) to (12).

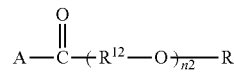  (10)

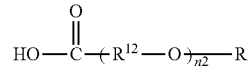  (11)

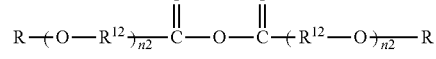  (12)

In the formula (10) to formula (12), R and a preferred embodiment thereof are the same as those for R in the formula (1). A represents a halogen atom, and preferably a chlorine atom.

In the formula (10) to formula (12), $R^{12}$ and n2 and preferred embodiments thereof are the same as those for $R^{12}$ and n2 in the formula (1-4).

Specific examples of the compounds represented by the formula (10) to formula (12) include a fatty acid, a fatty acid halide, and a fatty acid anhydride, each having the aforementioned desired carbon number.

Although the amount of the hydrophobizing agent to be used may be appropriately selected taking into consideration the desired degree of substitution ($MS_R$) of the hydrocarbon group (R) and the reaction yield, from the viewpoint of solubility in water of the polysaccharide derivative and obtaining the effects of the present invention, it is preferably 0.01 mol or more, and more preferably 0.03 mol or more per mol of the constituent monosaccharide unit of the hydroxyalkylated polysaccharide, and from the aforementioned viewpoint and the viewpoint of production cost of the polysaccharide derivative, it is preferably 5 mol or less, more preferably 3 mol or less, still more preferably 1 mol or less, yet still more preferably 0.5 mol or less, and even yet still more preferably 0.2 mol or less.

The addition method of the hydrophobizing agent may be any of batch, intermittent, and continuous methods.

<Production Method of Polysaccharide Derivative>

As for the production method of the polysaccharide derivative of the present invention, it is preferred to allow the hydroxyalkylated polysaccharide to react with the aforementioned cationizing agent and introducing agent (hydrophobizing agent) of the hydrocarbon group (R), thereby introducing the cationic group and the hydrocarbon group (R).

As for the production method of the polysaccharide derivative of the present invention, from the viewpoint of easiness of production and transparency of the resulting polysaccharide derivative, it is more preferred to introduce the hydrocarbon group (R) having 2 or more carbon atoms into the hydroxyalkylated polysaccharide having a weight average molecular weight of 10,000 or more and 740,000 or less, followed by allowing the hydroxyalkylated polysaccharide to react with the cationizing agent. That is, it is more preferred that the hydroxyalkylated polysaccharide having a weight average molecular weight of 10,000 or more and 740,000 or less is allowed to react with the aforementioned hydrophobizing agent to introduce the hydrocarbon group (R) having 2 or more carbon atoms, followed by allowing the hydroxyalkylated polysaccharide to react with the aforementioned cationizing agent, thereby introducing the cationic group.

From the viewpoint of easiness of production and transparency of the resulting polysaccharide derivative, the production method of the polysaccharide derivative of the present invention is still more preferably a production method in which the hydroxylated polysaccharide is allowed to react with the aforementioned hydrophobizing agent in the presence of an alkaline compound, to introduce the hydrocarbon group (R) having 2 or more carbon atoms, followed by allowing the hydroxyalkylated polysaccharide to react with the cationizing agent without including a cleaning step, thereby introducing the cationic group.

All of these reactions are preferably performed in the coexistence of an alkaline compound. Examples of the alkaline compound which is used for the reaction include alkali metal hydroxides, such as sodium hydroxide, potassium hydroxide, and lithium hydroxide; alkaline earth metal hydroxides, such as magnesium hydroxide and calcium hydroxide; and tertiary amine compounds, such as trimethylamine and triethylamine. Of these, from the viewpoint of reaction rate in introduction reaction, alkali metal hydroxides or alkaline earth metal hydroxides are preferred, alkali metal hydroxides are more preferred, and sodium hydroxide and potassium hydroxide are still more preferred. These alkaline compounds can be used either alone or in combination of two or more thereof.

The addition method of the alkaline compound is not particularly limited and may be either batch addition or split addition. In addition, the alkaline compound may be added in a solid form or may be added after being formed as an aqueous solution.

In the introduction reactions of the cationic group and the hydrocarbon group, in the case where the alkaline compound is a monovalent basic compound, from the viewpoint of reaction selectivity of a reaction agent, the amount of the alkaline compound which is used for each of the introduction reactions is 0.01 mol or more, more preferably 0.05 mol or more, and still more preferably 0.1 mol or more per mol of the constituent monosaccharide unit of the raw material polysaccharide (1 mol of an anhydroglucose unit (AGU) in the case where the raw material polysaccharide is cellulose); and from the same viewpoint, the amount of the alkaline compound is preferably 10 mol or less, more preferably 5 mol or less, still more preferably 3 mol or less, yet still more preferably 2 mol or less, even yet still more preferably 1.0 mol or less, even still more preferably 0.8 mol or less, and even still more further preferably 0.5 mol or less.

The preferred amount of the alkaline compound which is used in the case of simultaneously performing the introduction reaction of the cationic group and the introduction reaction of the hydrocarbon group is the same as the amount of the alkaline compound which is used for each of the introduction reaction of the cationic group and the introduction reaction of the hydrocarbon.

In the case where the alkaline compound which is used for the introduction reaction of the hydroxyalkyl group, the introduction reaction of the cationic group, or the introduction reaction of the hydrocarbon group (R) is a polyvalent base, such as an alkaline earth metal hydroxide, a preferred range of the alkaline compound to be used is a range resulting from dividing a preferred range of the amount of the alkaline compound in each of the aforementioned reactions by the valence of the polyvalent base. For example, in the case where the alkaline compound to be used is calcium hydroxide (divalent base), from the viewpoint of reaction selectivity, the amount of calcium hydroxide is preferably 0.005 mol or more, more preferably 0.025 mol or more, and still more preferably 0.05 mol or more per mol of AGU of the raw material cellulose, and from the same viewpoint, the amount of calcium hydroxide is preferably 5 mol or less, more preferably 2.5 mol or less, still more preferably 1.5 mol or less, yet still more preferably 1 mol or less, even yet still more preferably 0.5 mol or less, even still more preferably 0.4 mol or less, and even still more further preferably 0.25 mol or less.

That is, the amount of the alkaline compound is preferably 0.01 or more molar equivalents, more preferably 0.05 or more molar equivalents, and still more preferably 0.1 or more molar equivalents, and it is preferably 10 or less molar equivalents, more preferably 5 or less molar equivalents, still more preferably 3 or less molar equivalents, yet still more preferably 2 or less molar equivalents, even yet still more preferably 1 or less molar equivalents, even still more preferably 0.8 or less molar equivalents, and even still more further preferably 0.5 or less molar equivalents, per mol of the constituent monosaccharide unit of the hydroxyalkylated polysaccharide (1 mol of the anhydroglucose unit (AGU) of the raw material cellulose in the case where the hydroxyalkylated polysaccharide is a hydroxyalkylated cellulose).

The molar equivalent of the alkaline compound is the same as the molar number in the case where the alkaline compound is a monovalent basic compound, such as sodium hydroxide, and it is a value obtained by multiplying the molar number by the valence in the case where the alkaline compound is a divalent basic compound, such as calcium hydroxide.

From the viewpoint of reactivity, a molar equivalent ratio of the alkaline compound to the cationizing agent [(alkaline compound)/(cationizing agent)] is preferably 0.1 or more, and more preferably 0.5 or more, and from the viewpoint of enhancing the transparency of the resulting polysaccharide derivative, it is preferably 2 or less, and more preferably 1.8 or less. In the case where the cationizing agent is polyvalent, the foregoing molar equivalent ratio is calculated in the same manner.

In the present invention, the hydroxyalkyl cellulose can be obtained by allowing powdery or floc-like cellulose and the aforementioned hydroxyalkylated agent to react with each other, to perform an introduction reaction of the hydroxyalkyl group.

The introduction reaction of the hydroxyalkyl group (hydroxyalkylation reaction), the introduction reaction of the cationic group (cationization reaction), and the introduction reaction of the hydrocarbon group (R) (hydrophobization reaction) are also referred to collectively as "reaction during polysaccharide derivative production".

In the respective reactions during polysaccharide derivative production, a mode during addition of each of the hydroxyalkylating agent, the cationizing agent, and the introducing agent of the hydrocarbon group (R) is not particularly limited. In the case where each of the hydroxyalkylating agent, the cationizing agent, and the introducing agent of the hydrocarbon group is in a liquid form, each of them may be used as it is, or it may also be used in a diluted form with a good solvent for the hydroxyalkylating agent, the cationizing agent, and the introducing agent of the hydrocarbon group, such as water and a nonaqueous solvent.

Examples of the nonaqueous solvent which is used for dilution include generally used secondary or tertiary lower alcohols having 3 or more and 4 or less carbon atoms, such as isopropanol and tert-butanol; ketones having 3 or more and 6 or less carbon atoms, such as acetone, methyl ethyl ketone, and methyl isobutyl ketone; ethers, such as tetrahydrofuran, 1,4-dioxane, ethylene glycol dimethyl ether, and diethylene glycol dimethyl ether; and aprotic polar solvents, such as dimethyl sulfoxide.

As for the respective reactions during polysaccharide derivative production, in the aforementioned method (ii), the reaction is performed by dissolving the raw material cellulose with a solvent capable of dissolving the cellulose therein during the reaction; however, even in the methods (i) and (iii), from the viewpoint of reaction yield of the hydroxyalkylating agent, the cationizing agent, and the introducing agent of the hydrocarbon group, the reaction can also be performed in the presence of a nonaqueous solvent. As the nonaqueous solvent, the same nonaqueous solvent as mentioned above can be used.

Although a cleaning step may be included between the introduction reaction of the hydrocarbon group (R) (hydrophobization reaction) and the introduction reaction of the cationic group (cationization reaction), from the viewpoint of easiness of production, it is preferred that the cleaning step is not included. By allowing the molar ratio of the alkaline compound to the cationizing agent [(alkaline compound)/(cationizing agent)] to fall within the aforementioned range, after the hydrophobization reaction, it is not needed to remove the excessive alkaline compound through the cleaning step, and the cationization reaction can be performed. The cleaning step is a step in which by washing a reaction intermediate having the hydrocarbon group (R) introduced thereinto with hot water or a solvent, such as isopropyl alcohol and acetone, the unreacted introducing agent of the hydrocarbon group (R) can be removed, and the alkaline compound can be removed as a salt through neutralization or like. After the cleaning step, filtration and drying are performed, and then, the alkaline compound is again added, whereby the cationization reaction can be achieved.

Examples of an apparatus which is used for the respective reactions during polysaccharide derivative production include a flask, a SUS reaction vessel, a mixer, such as a Redige mixer capable of achieving stirring, and a mixing machine, such as a so-called kneader used for kneading powders, high-viscosity substances, resins, etc.

From the viewpoint of reaction rate, the temperature during reaction of the respective reactions during polysaccharide derivative production is preferably 0° C. or higher, more preferably 20° C. or higher, and still more preferably 30° C. or higher. In addition, from the standpoint of suppressing decomposition of the hydroxyalkylating agent, the cationizing agent, or the introducing agent of the hydrocarbon group, the foregoing temperature is preferably 200° C. or lower, and more preferably 100° C. or lower.

From the viewpoint of reactivity, the reaction temperature at which the hydrocarbon group is introduced (in the hydrophobization reaction) is preferably 55° C. or higher, and more preferably 60° C. or higher, and from the viewpoint of suppressing decomposition, it is preferably 200° C. or lower, and more preferably 100° C. or lower.

From the viewpoint of reactivity, the reaction temperature for allowing to react with the cationizing agent is preferably 20° C. or higher, more preferably 30° C. or higher, and still more preferably 40° C. or higher, and from the viewpoint of transparency of the resulting polysaccharide derivative, it is preferably lower than 55° C., more preferably 53° C. or lower, and still more preferably 51° C. or lower.

From the viewpoint of suppressing coloration and reduction of the molecular weight of a main chain derived from the monosaccharide unit, it is preferred to perform the respective reactions during polysaccharide derivative production in an inert gas atmosphere, such as nitrogen, as the need arises, respectively.

After completion of the reaction, the alkaline compound can be neutralized with an acid. On separately performing the hydroxyalkylation reaction, the cationization reaction, and the introduction reaction of the hydrocarbon group, though the neutralization can be achieved between the respective reactions, from the viewpoint of suppressing formation of a neutral salt, it is preferred to perform the neutralization after completion of all of the reactions. As the acid, an inorganic acid, such as sulfuric acid, hydrochloric acid, and phosphoric acid, and an organic acid, such as acetic acid and lactic acid, can be used.

The polysaccharide derivative obtained after completion of all of the reactions during polysaccharide derivative production can also be used after performing separation by means of filtration, etc., or removal of the unreacted hydroxyalkylating agent, cationizing agent, and introducing agent of the hydrocarbon group, a by-product derived from the these reaction agents, and a salt formed as a by-product through neutralization, etc., upon washing with hot water, hydrated isopropyl alcohol, a hydrated acetone solvent, etc. Besides, as the purification method, a general purification method, such as reprecipitation purification, centrifugation, and dialysis, can be adopted.

The present invention further discloses the following <1> to <63>.

<1> At least one polysaccharide derivative selected from the following (A) and (B);

(A) a polysaccharide derivative having a cationic group and a hydrocarbon group (R) having 2 or more carbon atoms, wherein the hydrocarbon group (R) is bound to a group resulting from eliminating a hydrogen atom from a hydroxy group of a hydroxyalkylated polysaccharide, directly or via a hydrocarbon group having an oxygen atom; the hydroxyalkylated polysaccharide is a hydroxyethylated polysaccharide or a hydroxypropylated polysaccharide; and the hydroxyalkylated polysaccharide has a weight average molecular weight of 10,000 or more and 740,000 or less; and (B) a polysaccharide derivative having a cationic group and a hydrocarbon group (R) having 2 or more carbon atoms, wherein the hydrocarbon group (R) is bound to a group resulting from eliminating a hydrogen atom from a hydroxy group of a hydroxyalkylated polysaccharide, directly or via a connecting group (exclusive of the cationic group); and the hydroxyalkylated polysaccharide has a weight average molecular weight of 10,000 or more and 190,000 or less.

<2> The polysaccharide derivative as set forth in <1>, wherein the degree of substitution ($MS_C$) of the cationic group is preferably 0.001 or more, more preferably 0.005 or more, still more preferably 0.01 or more, yet still more preferably 0.02 or more, even yet still more preferably 0.05 or more, and even still more preferably 0.07 or more.

<3> The polysaccharide derivative as set forth in <1> or <2>, wherein the degree of substitution ($MS_C$) of the cationic group is preferably 1 or less, more preferably 0.5 or less, still more preferably 0.4 or less, yet still more preferably 0.35 or less, even yet still more preferably 0.3 or less, even still more preferably 0.25 or less, even still more further preferably 0.2 or less, and even yet still more further preferably 0.15 or less.

<4> The polysaccharide derivative as set forth in any of <1> to <3>, wherein the degree of substitution ($MS_C$) of the cationic group is preferably 0.001 or more and 1 or less, more preferably 0.001 or more and 0.5 or less, still more preferably 0.001 or more and 0.4 or less, yet still more preferably 0.001 or more and 0.35 or less, even yet still more preferably 0.001 or more and 0.3 or less, even still more preferably 0.005 or more and 0.3 or less, even still more further preferably 0.01 or more and 0.25 or less, even yet still more further preferably 0.02 or more and 0.2 or less, even yet still more further preferably 0.05 or less and 0.2 or less, and even yet still more further preferably 0.07 or more and 0.15 or less.

<5> The polysaccharide derivative as set forth in any of <1> to <4>, wherein the degree of substitution ($MS_R$) of the hydrocarbon group (R) is preferably 0.001 or more, more preferably 0.003 or more, still more preferably 0.005 or more, yet still more preferably 0.008 or more, even yet still more preferably 0.01 or more, and even still more preferably 0.015 or more.

<6> The polysaccharide derivative as set forth in any of <1> to <5>, wherein the degree of substitution ($MS_R$) of the hydrocarbon group (R) is preferably 1 or less, more preferably 0.5 or less, still more preferably 0.3 or less, yet still more preferably 0.1 or less, even yet still more preferably 0.08 or less, even still more preferably 0.06 or less, even still more further preferably 0.05 or less, even yet still more further preferably 0.04 or less, and even yet still more further preferably 0.03 or less.

<7> The polysaccharide derivative as set forth in any of <1> to <6>, wherein the degree of substitution ($MS_R$) of the hydrocarbon group (R) is preferably 0.001 or more and 1 or less, more preferably 0.001 or more and 0.5 or less, still more preferably 0.001 or more and 0.3 or less, yet still more preferably 0.001 or more and 0.1 or less, even yet still more preferably 0.001 or more and 0.05 or less, even still more preferably 0.003 or more and 0.05 or less, even still more further preferably 0.003 or more and 0.04 or less, even yet still more further preferably 0.005 or more and 0.04 or less, even yet still more further preferably 0.005 or more and 0.03 or less, even yet still more further preferably 0.008 or more and 0.03 or less, even yet still more further preferably 0.01 or more and 0.03 or less, and even yet still more further preferably 0.015 or more and 0.03 or less.

<8> The polysaccharide derivative as set forth in any of <1> to <3>, wherein preferably, not only the degree of substitution ($MS_C$) of the cationic group is 0.001 or more and 1 or less, but also the degree of substitution ($MS_R$) of the hydrocarbon group (R) is 0.001 or more and 1 or less; more preferably, not only the degree of substitution ($MS_C$) of the cationic group is 0.001 or more and 0.5 or less, but also the degree of substitution ($MS_R$) of the hydrocarbon group (R) is 0.001 or more and 0.3 or less; still more preferably, not only the degree of substitution ($MS_C$) of the cationic group is 0.001 or more and 0.4 or less, but also the degree of substitution ($MS_R$) of the hydrocarbon group (R) is 0.001 or more and 0.1 or less; yet still more preferably, not only the degree of substitution ($MS_C$) of the cationic group is 0.001 or more and 0.4 or less, but also the degree of substitution ($MS_R$) of the hydrocarbon group (R) is 0.001 or more and 0.05 or less; even yet still more preferably, not only the degree of substitution ($MS_C$) of the cationic group is 0.005 or more and 0.3 or less, but also the degree of substitution ($MS_R$) of the hydrocarbon group (R) is 0.003 or more and 0.04 or less; even still more preferably, not only the degree of substitution ($MS_C$) of the cationic group is 0.02 or more and 0.2 or less, but also the degree of substitution ($MS_R$) of the hydrocarbon group (R) is 0.008 or more and 0.03 or less; and even still more further preferably, not only the degree of substitution ($MS_C$) of the cationic group is 0.07 or more and 0.15 or less, but also the degree of substitution ($MS_R$) of the hydrocarbon group (R) is 0.015 or more and 0.03 or less.

<9> The polysaccharide derivative as set forth in any of <1> to <8>, wherein the carbon number of the hydrocarbon group (R) is 2 or more, preferably 4 or more, more preferably 6 or more, still more preferably 8 or more, and yet still more preferably 10 or more.

<10> The polysaccharide derivative as set forth in any of <1> to <9>, wherein the carbon number of the hydrocarbon group (R) is preferably 22 or less, more preferably 18 or less, still more preferably 16 or less, yet still more preferably 15 or less, and even yet still more preferably 14 or less.

<11> The polysaccharide derivative as set forth in any of <1> to <10>, wherein the carbon number of the hydrocarbon group (R) is preferably 2 or more and 22 or less, more preferably 4 or more and 22 or less, still more preferably 4 or more and 18 or less, yet still more preferably 4 or more and 16 or less, even yet still more preferably 4 or more and 15 or less, even still more preferably 8 or more and 15 or less, even still more further preferably 8 or more and 14 or less, and even yet still more further preferably 10 or more and 14 or less.

<12> The polysaccharide derivative as set forth in any of <1> to <11>, wherein the divalent hydrocarbon group having an oxygen atom preferably contains an ester group and/or an ether group, and more preferably contains an ether group.

<13> A polysaccharide derivative having a cationic group and a hydrocarbon group (R) having 4 or more and 15 or less carbon atoms, the polysaccharide derivative being a polysaccharide derivative having a degree of substitution ($MS_C$) of the cationic group of 0.001 or more and 0.4 or less and a degree of substitution ($MS_R$) of the hydrocarbon group of 0.001 or more and 0.05 or less, wherein the hydrocarbon group (R) is bound to a group resulting from eliminating a hydrogen atom from a hydroxy group of a hydroxyalkylated polysaccharide, directly or via a hydrocarbon group having an oxygen atom; the hydroxyalkylated polysaccharide is a hydroxyethylated polysaccharide or a hydroxypropylated polysaccharide; and the hydroxyalkylated polysaccharide has a weight average molecular weight of 10,000 or more and 740,000 or less.

<14> The polysaccharide derivative as set forth in <13>, wherein preferably, not only the degree of substitution ($MS_C$) of the cationic group is 0.005 or more and 0.3 or less, but also the degree of substitution ($MS_R$) of the hydrocarbon group (R) is 0.003 or more and 0.04 or less; more preferably, not only the degree of substitution ($MS_C$) of the cationic group is 0.02 or more and 0.2 or less, but also the degree of substitution ($MS_R$) of the hydrocarbon group (R) is 0.008 or more and 0.03 or less; and still more preferably, not only the degree of substitution ($MS_C$) of the cationic group is 0.07 or more and 0.15 or less, but also the degree of substitution ($MS_R$) of the hydrocarbon group (R) is 0.015 or more and 0.03 or less.

<15> The polysaccharide derivative as set forth in <13> or <14>, wherein the carbon number of the hydrocarbon group (R) is preferably 8 or more and 15 or less, more preferably 8 or more and 14 or less, and still more preferably 10 or more and 14 or less.

<16> The polysaccharide derivative as set forth in any of <13> to <15>, wherein the hydrocarbon group having an oxygen atom preferably contains an ester group and/or an ether group, and more preferably contains an ether group.

<17> A polysaccharide derivative having a cationic group and a hydrocarbon group (R), the polysaccharide derivative being a polysaccharide derivative in which the hydrocarbon group (R) is bound to a group resulting from eliminating a hydrogen atom from a hydroxy group of a hydroxyalkylated polysaccharide via a connecting group containing an ether group, wherein the hydroxyalkylated polysaccharide is a hydroxyethylated polysaccharide or a hydroxypropylated polysaccharide; and the hydroxyalkylated polysaccharide has a weight average molecular weight of 10,000 or more and 740,000 or less.

<18> The polysaccharide derivative as set forth in <17>, wherein preferably, not only the degree of substitution ($MS_C$) of the cationic group is 0.001 or more and 1 or less, but also the degree of substitution ($MS_R$) of the hydrocarbon group (R) is 0.001 or more and 1 or less; more preferably, not only the degree of substitution ($MS_C$) of the cationic group is 0.001 or more and 0.5 or less, but also the degree of substitution ($MS_R$) of the hydrocarbon group (R) is 0.001 or more and 0.3 or less; still more preferably, not only the degree of substitution ($MS_C$) of the cationic group is 0.001 or more and 0.4 or less, but also the degree of substitution ($MS_R$) of the hydrocarbon group (R) is 0.001 or more and 0.1 or less; yet still more preferably, not only the degree of substitution ($MS_C$) of the cationic group is 0.001 or more and 0.4 or less, but also the degree of substitution ($MS_R$) of the hydrocarbon group (R) is 0.001 or more and 0.05 or less; even yet still more preferably, not only the degree of substitution ($MS_C$) of the cationic group is 0.005 or more and 0.3 or less, but also the degree of substitution ($MS_R$) of the hydrocarbon group (R) is 0.003 or more and 0.04 or less; even still more preferably, not only the degree of substitution ($MS_C$) of the cationic group is 0.02 or more and 0.2 or less, but also the degree of substitution ($MS_R$) of the hydrocarbon group (R) is 0.008 or more and 0.03 or less; and even still more further preferably, not only the degree of substitution ($MS_C$) of the cationic group is 0.07 or more and 0.15 or less, but also the degree of substitution ($MS_R$) of the hydrocarbon group (R) is 0.015 or more and 0.03 or less.

<19> The polysaccharide derivative as set forth in <17> or <18>, wherein the carbon number of the hydrocarbon group (R) is preferably 2 or more and 22 or less, more preferably 4 or more and 18 or less, still more preferably 4 or more and 16 or less, yet still more preferably 4 or more and 15 or less, even yet still more preferably 8 or more and 15 or less, even still more preferably 8 or more and 14 or less, and even yet still more further preferably 10 or more and 14 or less.

<20> The polysaccharide derivative as set forth in any of <1> to <19>, wherein the hydroxyalkylated polysaccharide is a polysaccharide, such as cellulose, guar gum, and starch, or a polysaccharide having a substituent, such as a methyl group, introduced into such a polysaccharide, further having at least one selected from a hydroxyethyl group and a hydroxypropyl group.

<21> The polysaccharide derivative as set forth in any of <1> to <20>, wherein the hydroxyalkylated polysaccharide is hydroxyethyl cellulose, hydroxyethyl guar gum, hydroxyethyl starch, hydroxypropyl cellulose, hydroxypropyl guar gum, hydroxypropyl starch, hydroxyethylmethyl cellulose, hydroxyethylmethyl guar gum, hydroxyethylmethyl starch, hydroxypropylmethyl cellulose, hydroxypropylmethyl guar gum, or hydroxypropylmethyl starch.

<22> The polysaccharide derivative as set forth in any of <1> to <21>, wherein the polysaccharide is preferably cellulose or guar gum, and more preferably cellulose.

<23> The polysaccharide derivative as set forth in any of <1> to <22>, wherein the degree of substitution of the hydroxyalkyl group is preferably 0.1 or more, more preferably 0.5 or more, still more preferably 1 or more, and yet still more preferably 1.5 or more.

<24> The polysaccharide derivative as set forth in any of <1> to <23>, wherein the degree of substitution of the hydroxyalkyl group is preferably 10 or less, more preferably 8 or less, still more preferably 5 or less, yet still more preferably 3 or less, and even yet still more preferably 2.5 or less.

<25> The polysaccharide derivative as set forth in any of <1> to <24>, wherein the degree of substitution of the hydroxyalkyl group is preferably 0.1 or more and 10 or less, more preferably 0.5 to 8 or less, still more preferably 1 or more and 5 or less, yet still more preferably 1.5 or more and 3 or less, and even yet still more preferably 1.5 or more and 2.5 or less.

<26> The polysaccharide derivative as set forth in any of <1> to <25>, wherein the degree of substitution of the glycerol group is preferably less than 0.5, more preferably less than 0.1, and still more preferably 0, namely the hydroxyalkylated polysaccharide does not have the glycerol group.

<27> The polysaccharide derivative as set forth in any of <1> to <26>, wherein the weight average molecular weight of the hydroxyalkylated polysaccharide is 10,000 or more, preferably 30,000 or more, more preferably 50,000 or more, still more preferably 70,000 or more, yet still more preferably 100,000 or more, and even yet still more preferably 130,000 or more.

<28> The polysaccharide derivative as set forth in any of <1> to <27>, wherein the weight average molecular weight of the hydroxyalkylated polysaccharide is 740,000 or less, preferably 720,000 or less, more preferably 650,000 or less, still more preferably 600,000 or less, yet still more preferably 500,000 or less, even yet still more preferably 400,000 or less, even still more preferably 300,000 or less, and even still more further preferably 200,000 or less; and it is preferably 190,000 or less, more preferably 180,000 or less, still more preferably 170,000 or less, and yet still more preferably 160,000 or less.

<29> The polysaccharide derivative as set forth in any of <1> to <28>, wherein the weight average molecular weight of the hydroxyalkylated polysaccharide is 10,000 or more and 740,000 or less, preferably 10,000 or more and 720,000 or less, more preferably 10,000 or more and 650,000 or less, still more preferably 30,000 or more and 600,000 or less, yet still more preferably 50,000 or more an 500,000 or less, even yet still more preferably 70,000 or more and 400,000 or less, even still more preferably 100,000 or more and 300,000 or less, and even still more further preferably 130,000 or more and 200,000 or less; and it is preferably 130,000 or more and 190,000 or less, more preferably 130,000 or more and 180,000 or less, still more preferably 130,000 or more and 170,000 or less, and yet still more preferably 130,000 or more and 160,000 or less.

<30> The polysaccharide derivative as set forth in any of <1> to <29>, wherein the cationic group is represented by the formula (2-1) or formula (2-2).

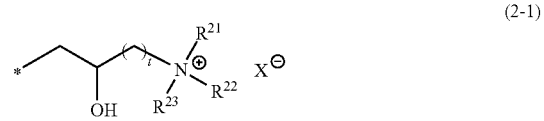

(2-1)

(2-2)

In the formula (2-1) and formula (2-2), $R^{21}$ to $R^{23}$ each independently represent a hydrocarbon group having 1 or more and 24 or less carbon atoms; $X^-$ represents an anion; t represents an integer of 0 or more and 3 or less; and * represents a binding position to a group resulting from eliminating a hydrogen atom from a hydroxy group of the hydroxyalkylated polysaccharide.

<31> The polysaccharide derivative as set forth in <30>, wherein in the formulae (2-1) and (2-2), $R^{21}$ to $R^{23}$ each independently represent a hydrocarbon group having 1 or more and 24 or less carbon atoms, preferably a linear or branched hydrocarbon group having 1 or more and 4 or less carbon atoms, more preferably a methyl group, an ethyl group, a n-propyl group, an isopropyl group, a n-butyl group, a sec-butyl group, a tert-butyl group, or an isobutyl group, and still more preferably a methyl group or an ethyl group; all of $R^{21}$ to $R^{23}$ are yet still more preferably a methyl group or an ethyl group; and all of $R^{21}$ to $R^{23}$ are even yet still more preferably a methyl group.

<32> The polysaccharide derivative as set forth in any of <1> to <31>, wherein the hydrocarbon group (R) is bound to a group resulting from eliminating a hydrogen atom from a hydroxy group of the hydroxyalkylated polysaccharide, via a connecting group Z represented by the following formula (1).

$$*\text{--}Z\text{--}R \quad (1)$$

In the formula (1), Z represents a single bond or a divalent hydrocarbon group having an oxygen atom; R represents a hydrocarbon group having 2 or more carbon atoms; and * represents a binding position to a group resulting from eliminating a hydrogen atom from a hydroxy group of the hydroxyalkylated polysaccharide.

<33> The polysaccharide derivative as set forth in <32>, wherein in the formula (1), the connecting group Z preferably has an epoxy group-derived group or an oxyglycidyl group-derived group, and more preferably has an oxyglycidyl group-derived group.

<34> The polysaccharide derivative as set forth in any of <1> to <33>, wherein the ratio ($MS_R/MS_C$) of the degree of substitution ($MS_R$) of the hydrocarbon group (R) to the degree of substitution ($MS_C$) of the cationic group in the polysaccharide derivative is preferably 0.001 or more, more preferably 0.005 or more, still more preferably 0.01 or more, and yet still more preferably 0.05 or more.

<35> The polysaccharide derivative as set forth in any of <1> to <34>, wherein the ratio ($MS_R/MS_C$) of the degree of substitution ($MS_R$) of the hydrocarbon group (R) to the degree of substitution ($MS_C$) of the cationic group in the polysaccharide derivative is preferably 1 or less, more preferably 0.8 or less, still more preferably 0.6 or less, yet still more preferably 0.5 or less, and even yet still more preferably 0.3 or less.

<36> The polysaccharide derivative as set forth in any of <1> to <35>, wherein the ratio ($MS_R/MS_C$) of the degree of substitution ($MS_R$) of the hydrocarbon group (R) to the degree of substitution ($MS_C$) of the cationic group in the polysaccharide derivative is preferably 0.001 or more and 1 or less, more preferably 0.005 or more and 0.8 or less, still more preferably 0.005 or more and 0.6 or less, yet still more preferably 0.01 or more and 0.5 or less, even yet still more preferably 0.05 or more and 0.5 or less, and even still more further preferably 0.05 or more and 0.3 or less.

<37> The polysaccharide derivative as set forth in any of <1> to <36>, wherein the ratio ($MS_A/MS_C$) of the degree of substitution ($MS_A$) of the anionic group to the degree of substitution ($MS_C$) of the cationic group in the polysaccharide derivative is preferably 3 or less, more preferably 2 or less, still more preferably 1.7 or less, yet still more preferably 1.5 or less, even yet still more preferably 1 or less, even still more preferably 0.5 or less, and even still more further preferably 0.1 or less, and it may be 0 or more, and even yet still more further preferably 0.

<38> The polysaccharide derivative as set forth in any of <1> to <37>, wherein the polysaccharide derivative may have an anionic group; and the degree of substitution ($MS_A$) of the anionic group in the polysaccharide derivative is preferably 0.3 or less, more preferably 0.1 or less, still more preferably 0.1 or less, yet still more preferably less than 0.01, and even yet still more preferably 0.001 or less, and it may be 0 or more, and even still more preferably 0.

<39> The polysaccharide derivative as set forth in any of <1> to <38>, wherein preferably, not only the ratio ($MS_R/MS_C$) of the degree of substitution ($MS_R$) of the hydrocarbon group (R) to the degree of substitution ($MS_C$) of the cationic group in the polysaccharide derivative is 0.001 or more and 1 or less, but also the ratio ($MS_A/MS_C$) of the degree of substitution ($MS_A$) of the anionic group to the degree of substitution ($MS_C$) of the cationic group is 3 or less; more preferably, not only the ($MS_R/MS_C$) is 0.005 or more and 0.8 or less, but also the ($MS_A/MS_C$) is 1.5 or less; still more preferably, not only the ($MS_R/MS_C$) is 0.005 or more and 0.6 or less, but also the ($MS_A/MS_C$) is 1 or less; yet still more preferably, not only the ($MS_R/MS_C$) is 0.05 or more and 0.5 or less, but also the ($MS_A/MS_C$) is 0.5 or less; and even yet still more preferably, not only the ($MS_R/MS_C$) is 0.05 or more and 0.3 or less, but also the ($MS_A/MS_C$) is 0.3 or less.

<40> The polysaccharide derivative as set forth in any of <1> to <39>, wherein the degree of substitution ($MS_C$) of the cationic group is 0.001 or more and 0.5 or less, the degree of substitution ($MS_R$) of the hydrocarbon group is 0.001 or more and 0.3 or less, the ratio ($MS_R/MS_C$) of the degree of substitution ($MS_R$) of the hydrocarbon group (R) to the degree of substitution ($MS_C$) of the cationic group is 0.005 or more and 0.8 or less, and the ratio ($MS_A/MS_C$) of the degree of substitution ($MS_A$) of the anionic group to the degree of substitution ($MS_C$) of the cationic group is 1.5 or less.

<41> The polysaccharide derivative as set forth in any of <1> to <40>, wherein the degree of substitution ($MS_C$) of the cationic group is 0.001 or more and 0.4 or less, the degree of substitution ($MS_R$) of the hydrocarbon group is 0.001 or more and 0.1 or less, the ratio ($MS_R/MS_C$) of the degree of substitution ($MS_R$) of the hydrocarbon group (R) to the degree of substitution ($MS_C$) of the cationic group is 0.005 or more and 0.6 or less, and the ratio ($MS_A/MS_C$) of the degree of substitution ($MS_A$) of the anionic group to the degree of substitution ($MS_C$) of the cationic group is 1 or less.

<42> The polysaccharide derivative as set forth in any of <1> to <41>, wherein the degree of substitution ($MS_C$) of the cationic group is 0.005 or more and 0.3 or less, the degree of substitution ($MS_R$) of the hydrocarbon group (R) is 0.003 or more and 0.04 or less, the ratio ($MS_R/MS_C$) of the degree of substitution ($MS_R$) of the hydrocarbon group (R) to the degree of substitution ($MS_C$) of the cationic group is 0.05 or more and 0.5 or less, and the ratio ($MS_A/MS_C$) of the degree of substitution ($MS_A$) of the anionic group to the degree of substitution ($MS_C$) of the cationic group is 0.5 or less.

<43> The polysaccharide derivative as set forth in any of <1> to <42>, wherein the concentration of the polysaccharide derivative in an aqueous solution on treating the polysaccharide derivative is preferably 0.01 mg/L or more, more preferably 0.1 mg/L or more, still more preferably 0.3 mg/L or more, and yet still more preferably 0.5 mg/L or more.

<44> The polysaccharide derivative as set forth in any of <1> to <43>, wherein the concentration of the polysaccharide derivative on treating the polysaccharide derivative is preferably 10,000 mg/L or less, more preferably 1,000 mg/L or less, still more preferably 500 mg/L or less, and yet still more preferably 100 mg/L or less.

<45> The polysaccharide derivative as set forth in any of <1> to <44>, wherein the polysaccharide derivative is obtained by allowing a hydroxyalkylated polysaccharide to react with a cationizing agent and a hydrophobizing agent, thereby introducing a cationic group and a hydrocarbon group having 2 or more carbon atoms into the hydroxyalkylated polysaccharide; and the cationizing agent is at least one selected from compounds represented by the following formulae (3) and (4).

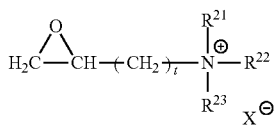

(3)

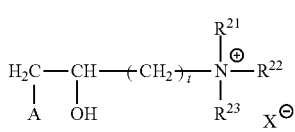

(4)

In the formulae (3) and (4), $R^{21}$ to $R^{23}$ each independently represent a hydrocarbon group having 1 or more and 24 or less carbon atoms; $X^-$ represents an anion; t represents an integer of 0 or more and 3 or less; A represents a halogen atom; and $R^{21}$ to $R^{23}$ are the same as or different from each other.

<46> The polysaccharide derivative as set forth in <45>, wherein the cationizing agent is selected from a chloride, a bromide, or an iodide of each of glycidyltrimethylammonium, glycidyltriethylammonium, and glycidyltripropylammonium; 3-chloro-2-hydroxypropyltrimethylammonium, 3-chloro-2-hydroxypropyltriethylammonium, 3-chloro-2-hydroxypropyltripropylammonium, 3-bromo-2-hydroxypropyltrimethylammonium, 3-bromo-2-hydroxypropyltriethylammonium, 3-bromo-2-hydroxypropyltripropylammonium, 3-iodo-2-hydroxypropyltrimethylammonium, 3-iodo-2-hydrxoypropyltriethylammonium, and 3-iodo-2-hydroxypropyltripropylammonium.

<47> The polysaccharide derivative as set forth in <45> or <46>, wherein the amount of the cationizing agent added is preferably 0.01 mol or more, more preferably 0.03 mol or more, still more preferably 0.05 mol or more, and yet still more preferably 0.1 mol or more per mol of the constituent monosaccharide unit of the hydroxyalkylated polysaccharide.

<48> The polysaccharide derivative as set forth in any of <45> to <47>, wherein the amount of the cationizing agent added is preferably 30 mol or less, more preferably 25 mol or less, still more preferably 10 mol or less, yet still more preferably 1 mol or less, and even yet still more preferably 0.5 mol or less per mol of the constituent monosaccharide unit of the hydroxyalkylated polysaccharide.

<49> The polysaccharide derivative as set forth in any of <1> to <48>, wherein the polysaccharide derivative is obtained by allowing a hydroxyalkylated polysaccharide to react with a cationizing agent and a hydrophobizing agent, thereby introducing a cationic group and a hydrocarbon group having 2 or more carbon atoms into the hydroxyalkylated polysaccharide; and the hydrophobizing agent is at least one selected from compounds represented by the following formulae (5) and (6).

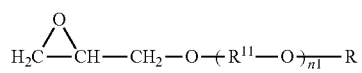

(5)

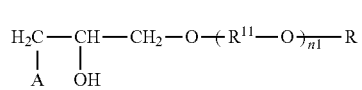

(6)

In the formula (5) and formula (6), $R^{11}$'s each independently represent an alkylene group having 2 to 4 carbon atoms; R represents a hydrocarbon group having 2 or more carbon atoms; * represents a binding position to a group resulting from eliminating a hydrogen atom from a hydroxy group of the hydroxyalkylated polysaccharide; n1 represents an average addition molar number of —$R^{11}$O—; n1 is 0 or more and 30 or less; and A represents a halogen atom.

<50> The polysaccharide derivative as set forth in <49>, wherein the compound represented by the formula (5) or formula (6) is a glycidyl ether having an alkyl group, such as ethyl glycidyl ether, propyl glycidyl ether, butyl glycidyl ether, pentyl glycidyl ether, hexyl glycidyl ether, heptyl glycidyl ether, octyl glycidyl ether, nonyl glycidyl ether, decyl glycidyl ether, undecyl glycidyl ether, dodecyl glycidyl ether, tridecyl glycidyl ether, tetradecyl glycidyl ether, pentadecyl glycidyl ether, hexadecyl glycidyl ether, heptadecyl glycidyl ether, and octadecyl glycidyl ether; and a glycidyl ether having an alkenyl group, such as butenyl glycidyl ether, pentenyl glycidyl ether, hexenyl glycidyl ether, heptenyl glycidyl ether, octenyl glycidyl ether, nonenyl glycidyl ether, decenyl glycidyl ether, undecenyl glycidyl ether, dodecenyl glycidyl ether, tridecenyl glycidyl ether, tetradecenyl glycidyl ether, pentadecenyl glycidyl ether, hexadecenyl glycidyl ether, heptadecenyl glycidyl ether, and octadecenyl glycidyl ether.

<51> The polysaccharide derivative as set forth in any of <1> to <50>, wherein the polysaccharide derivative is obtained by allowing a hydroxyalkylated polysaccharide to react with a cationizing agent and a hydrophobizing agent, thereby introducing a cationic group and a hydrocarbon group having 2 or more carbon atoms into the hydroxyalkylated polysaccharide; and the hydrophobizing agent is at least one selected from compounds represented by the following formulae (7) and (8).

(7)

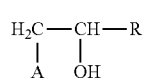

(8)

In the formula (7) and formula (8), R represents a hydrocarbon group having 2 or more carbon atoms; and A represents a halogen atom.

<52> The polysaccharide derivative as set forth in <51>, wherein the compound represented by the formula (7) is preferably a 1,2-epoxyalkane having 4 or more and 24 or less carbon atoms, and specifically 1,2-epoxytetradecane or 1,2-epoxyoctadecane; and the compound represented by the formula (8) is preferably a 1-halo-2-hydroxyalkane having 4 or more and 24 or less carbon atoms, and specifically 1-chloro-2-hydroxytetradecane.

<53> The polysaccharide derivative as set forth in any of <49> to <52>, wherein the amount of the hydrophobizing agent added is preferably 0.01 mol or more, and more preferably 0.03 mol or more per mol of the constituent monosaccharide unit of the hydroxyalkylated polysaccharide.

<54> The polysaccharide derivative as set forth in any of <49> to <53>, wherein the amount of the hydrophobizing agent added is preferably 5 mol or less, more preferably 3 mol or less, still more preferably 1 mol or less, yet still more preferably 0.5 mol or less, and even yet still more preferably 0.2 mol or less per mol of the constituent monosaccharide unit of the hydroxyalkylated polysaccharide.

<55> The polysaccharide derivative as set forth in any of <1> to <54>, wherein in the degree of substitution ($MS_R$) of the hydrocarbon group (R) having 2 or more carbon atoms, the degree of substitution ($MS_{9R}$) of the hydrocarbon group (R) having 9 or more carbon atoms ($MS_{9R}/MS_R$) is preferably 0.25 or more and 1 or less, more preferably 0.5 or more and 1 or less, still more preferably 0.9 or more and 1 or less, and yet still more preferably 1.

<56> A method for producing the polysaccharide derivative as set forth in any of <1> to <55>, including introducing a hydrocarbon group (R) having 2 or more carbon atoms into a hydroxyalkylated polysaccharide having a weight average molecular weight of 10,000 or more and 740,000 or less, followed by allowing to react with a cationizing agent.

<57> The method for producing the polysaccharide derivative as set forth in <56>, including introducing the hydrocarbon group (R) having 2 or more carbon atoms into the hydroxyalkylated polysaccharide in the presence of an alkaline compound, followed by allowing to react with a cationizing agent without including a cleaning step.

<58> The method for producing the polysaccharide derivative as set forth in <57>, wherein the molar equivalent ratio of the alkaline compound to the cationizing agent [(alkaline compound)/(cationizing agent)] is preferably 0.1 or more, and more preferably 0.5 or more.

<59> The method for producing the polysaccharide derivative as set forth in <57> or <58>, wherein the molar equivalent ratio of the alkaline compound to the cationizing agent [(alkaline compound)/(cationizing agent)] is preferably 2 or less, and more preferably 1.8 or less.

<60> The method for producing the polysaccharide derivative as set forth in any of <56> to <59>, wherein the reaction temperature at which the hydrocarbon group having 2 or more carbon atoms is introduced is preferably 55° C. or higher, and more preferably 60° C. or higher.

<61> The method for producing the polysaccharide derivative as set forth in any of <56> to <60>, wherein the reaction temperature at which the hydrocarbon group having 2 or more carbon atoms is introduced is preferably 200° C. or lower, and more preferably 100° C. or lower.

<62> The method for producing the polysaccharide derivative as set forth in any of <56> to <61>, wherein the reaction temperature for allowing to react with the cationizing agent is preferably 20° C. or higher, more preferably 30° C. or higher, and still more preferably 40° C. or higher.

<63> The method for producing the polysaccharide derivative as set forth in any of <56> to <62>, wherein the reaction temperature for allowing to react with the cationizing agent is lower than 55° C., more preferably 53° C. or lower, and still more preferably 51° C. or lower.

EXAMPLES

The measuring methods adopted in Examples and Comparative Examples are as follows.
[Measurement of Degree of Substitution (Molar Average Degree of Substitution (MS))]
Pretreatment
1 g of a powdery cellulose derivative was dissolved in 100 g of water, and then, an aqueous solution was charged in a dialytic membrane (Spectra/Por, molecular weight cutoff: 1,000) and subjected to dialysis for 2 days. The resulting aqueous solution was freeze-dried with a freeze dryer (eyela, FDU1100), to obtain a purified cellulose derivative.
<Calculation of Mass of Cationic Group by Kjeldahl Method>
200 mg of the purified cellulose derivative was accurately metered, to which were then added 10 mL of sulfuric acid and one tablet of a Kjeldahl tablet (manufactured by Merck), followed by undergoing thermal decomposition with a Kjeldahl decomposition apparatus (K-432, manufactured by BUCHI). After completion of decomposition, 30 mL of ion-exchanged water was added to the sample, and the nitrogen content (% by mass) of the sample was determined using an automatic Kjeldahl distillation apparatus (K-370, manufactured by BUCHI), thereby calculating the mass of the cationic group.
<Calculation of Mass of Hydrocarbon Group (Alkyl Group) by Zeisel Method>
A calculation method of the mass of an alkyl group that is the hydrocarbon group (R) is hereunder described while referring to the case of Example 1 (using lauryl glycidyl ether as an introducing agent of the hydrocarbon group) as an example. It is also possible to measure the case of using other introducing agent by appropriately selecting a sample for calibration curve (such as an iodoalkane and a hydrocarbon group-introducing agent).
200 mg of the purified cellulose derivative and 220 mg of adipic acid were accurately metered in a 10-mL vial (Mighty Vial No. 3), to which were then added 3 mL of an internal standard solution (tetradecane/o-xylene=1/25 (v/v)) and 3 mL of hydroiodic acid, followed by sealing up. In addition, a sample for calibration curve having 2, 4, or 9 mg of 1-iodododecane added thereto in place of the cellulose derivative was prepared. Each of the samples was heated under a condition at 160° C. for 2 hours by using a block heater (Reacti-Therm III Heating/Stirring module, manufactured by PIERCE) while stirring with a stirring chip. The sample was allowed to stand for cooling, and then, an upper layer (o-xylene layer) was recovered and analyzed for the amount of 1-iodododecane through gas chromatography (GC-2010 plus, manufactured by Shimadzu Corporation).
Condition for GC Analysis
Column: Agilent's HP-1 (length: 30 m, liquid phase membrane thickness: 0.25 μm, inner diameter: 32 mm)
Split ratio: 20
Column temperature: 100° C. (2 min)→10° C./min→300° C. (15 min)
Injector temperature: 300° C.
Detector: FID
Detector temperature: 330° C.
Amount of implantation: 2 μL The mass of the alkyl group in the sample was determined from the detection amount of 1-iodododecane obtained through GC.

<Measurement of Mass of Hydroxyalkyl Group>

The mass of the hydroxyalkyl group was measured in the same manner as in the aforementioned measurement of the mass of the alkyl group by quantitatively determining the hydroxyalkyl group-derived alkyl iodide.

<Calculation of Degree of Substitution (Molar Average Degree of Substitution) of Cationic Group, Alkyl Group, and Hydroxyalkyl Group>

From the masses of the aforementioned cationic group and the alkyl group that is the hydrocarbon group (R) and the masses of all of the samples, the mass of the hydroxyethyl cellulose (HEC) structure was calculated and converted into a substance amount (mol), respectively, thereby calculating the degree of substitution ($MS_C$) of the cationic group and the degree of substitution ($MS_R$) of the alkyl group.

With respect to the hydroxyalkyl group, the degree of substitution was calculated in the same manner.

<Calculation of Mass of Anionic Group by Atomic Absorption Spectrometry>

0.1 g of the cellulose derivative obtained in each of Examples 13 and 14 was collected in a decomposition container, to which were then appropriately added 4 mL of sulfuric acid (for precision analysis, manufactured by Wako Pure Chemical Industries, Ltd.) and nitric acid (for precision atomic absorption spectrometry, manufactured by Kanto Chemical Co., Inc.) and hydrogen peroxide (for precision atomic absorption spectrometry, manufactured by Wako Pure Chemical Industries, Ltd.) to undergo wet decomposition. Ultrapure water was added thereto up to the gauge line of 100 mL, to prepare an undiluted solution for sample measurement. This solution was diluted 25 times, to prepare a solution for sample measurement (the content of sulfuric acid was also prepared to the same degree as in the calibration curve).

Preparation of solution for calibration curve: Using a standard solution for atomic absorption spectrometry (Na: 1,000 mg/L, standard solution for atomic absorption spectrometry: 1,000 mg/L, manufactured by Kanto Chemical co., Inc.), solutions for calibration curve of 0.1 to 20 mg/L were prepared. Sulfuric acid was added to each of the solutions such that the sulfuric acid concentration was 4%.

With respect to the prepared samples, the Na content was measured with an ICP optical emission spectrometer under the following condition.

(Condition for Analysis)

Analyzer: iCAP 6500Duo, manufactured by Thermo Fisher Scientific Inc.
Measurement wavelength: Na 589.582 nm
RF power: 950 W
Flow rate of coolant gas: 12 L/min
Flow rate of nebulizer: 0.70 L/min
Auxiliary gas: 0.5 L/min
Flow rate of pump: 50 rpm By determining the Na content (% by mass) of the sample, the mass of the anionic group was calculated.

<Calculation of Degree of Substitution (Molar Average Degree of Substitution) of Each of Anionic Group, Cationic Group, Alkyl Group, and Hydroxyalkyl Group>

From the mass of the aforementioned anionic group, the masses of the aforementioned cationic group and alkyl group, and the masses of all of the samples, the mass of the HEC structure was calculated and converted into a substance amount (mol), respectively, thereby calculating the degree of substitution ($MS_A$) of the anionic group, the degree of substitution ($MS_C$) of the cationic group, and the degree of substitution ($MS_R$) of the alkyl group. With respect to the hydroxyalkyl group, the degree of substitution was calculated in the same manner.

<Calculation of Mass of Hydrophobic Group (Binding Species: Ammonium Group) by Kjeldahl Method>

200 mg of the cellulose derivative obtained in Comparative Example 4 was accurately metered, to which were then added 10 mL of sulfuric acid and one tablet of a Kjeldahl tablet (manufactured by Merck), followed by undergoing thermal decomposition with a Kjeldahl decomposition apparatus (K-432, manufactured by BUCHI). After completion of decomposition, 30 mL of ion-exchanged water was added to the sample, and the nitrogen content (% by mass) of the sample was determined using an automatic Kjeldahl distillation apparatus (K-370, manufactured by BUCHI). By subtracting the mass of the GMAC-derived cationic group, the mass of the hydrophobic group (binding species: ammonium salt) was calculated.

<Calculation of Degree of Substitution (Molar Average Degree of Substitution) of Each of Alkyl Group (Binding Species: Ammonium Group), Cationic Group, and Hydroxyalkyl Group>

From the mass of the aforementioned alkyl group (binding species: ammonium group), the mass of the aforementioned cationic group, and the masses of all of the samples, the mass of the HEC structure was calculated and converted into a substance amount (mol), respectively, thereby calculating the degree of substitution ($MS_{R-C}$) of the alkyl group (binding species: ammonium group) and the degree of substitution ($MS_C$) of the cationic group. With respect to the hydroxyalkyl group, the degree of substitution was calculated in the same manner.

[Measurement of Weight Average Molecular Weight]

The weight average molecular weight of hydroxyethyl cellulose (HEC) was calculated as expressed in terms of polyethylene glycol through GPC (gel permeation chromatography).

The conditions for measurement are as follows.

Column: TSKgel α-M
Eluent: 50 mmol/L LiBr, 1% $CH_3COOH$, ethanol/water=3/7
Temperature: 40° C.
Flow velocity: 0.6 mL/min Example 1

(1) Synthesis of Cellulose Derivative 90 g of hydroxyethyl cellulose (HEC) (Natrosol 250 JR, manufactured by Ashland Inc., weight average molecular weight: 150,000, degree of substitution of hydroxyethyl group: 2.5) was charged in a 1-L separable flask, and nitrogen was allowed to pass therethrough. 77.2 g of ion-exchanged water and 414.5 g of isopropyl alcohol (hereinafter referred to as "IPA") were added and stirred at 200 rpm for 5 minutes, and then, 10.9 g of a 48% sodium hydroxide aqueous solution was added, followed by further stirring for 15 minutes. Subsequently, 3.9 g of lauryl glycidyl ether (LA-EP, manufactured by Yokkaichi Chemical Co., Ltd.) was added, to undergo an alkylation reaction at 80° C. for 13 hours. Furthermore, 14.5 g of glycidyl trimethylammonium chloride (hereinafter also referred to as "GMAC"; SY-GTA80, manufactured by Sakamoto Yakuhin Kogyo Co., Ltd.) was added, to undergo a cationization reaction at 50° C. for 1.5 hours. Thereafter, 10.9 g of a 90% acetic acid aqueous solution was added, and stirring was performed for 30 minutes, to undergo a neutralization reaction.

The resulting suspension liquid was transferred equally into two 500-mL centrifuge tubes and centrifuged with a high-speed cooling centrifuge (CR21G III, manufactured by Hitachi Koki Co., Ltd.). A supernatant was removed through decantation, and an 85% IPA aqueous solution in the same amount as that of the removed supernatant was added, to undergo redispersion. Again, the operation of centrifugation and redispersion was repeated, and after performing the third centrifugation, a precipitate was taken out. The resulting precipitate was vacuum-dried at 80° C. for 12 hours by using a vacuum dryer (VR-420, manufactured by Advantec Co., Ltd.) and then crushed with an extreme mill (MX-1200X™, manufactured by Waring), to obtain a powdery cellulose derivative.

(2-1) Preparation of Chemical Fibers for Cleaning Evaluation

In a 100-mL screw tube, 40 mL of a processing liquid having the following composition and 5 sheets of polyester fabrics (6 cm×6 cm, a polyester faille, manufactured by Senshoku Shizai K.K.) were charged. Using a shaker (Model No.: SA300, manufactured by Yamato Scientific Co., Ltd.), horizontal reciprocating shaking was performed under a condition at 300 rpm for 5 minutes, thereby treating the polyester fabrics with the processing liquid. After treatment, the polyester fabrics were dehydrated with a twin tub washing machine (PS-H45L Type, manufactured by Hitachi, Ltd.) for 1 minute. Subsequently, 40 mL of ion-exchanged water for washing and the resulting polyester fabrics were charged in a 100-mL screw tube, and the polyester fabrics were rinsed by using the shaker under a condition at 300 rpm for 3 minutes. After rinsing, the resulting polyester fabrics were dehydrated with the twin tub washing machine for 1 minute and then naturally dried for 24 hours.

<Composition of Processing Liquid>

(A) Cellulose derivative: 0 or 30 mg/kg (B) Surfactant [(polyoxyethylene (3) lauryl ether sodium sulfate (a trade name: EMAL 20C))/(polyoxyethylene (10) lauryl ether (a trade name: EMULGEN 110L))=1/1 (w/w) in terms of active components)]: 80 mg/kg (2-2) Preparation of Soiled Fabric 0.1 mL of a model sebum artificial soiled liquid in which 0.02% Sudan III was mixed in oleic acid was uniformly applied on the polyester fabrics (36 cm$^2$) prepared in the above (2-1), followed by drying at 40° C. for 1 hour by using a constant temperature dryer (incubator FMS, manufactured by EYELA).

(3) Cleaning Test

A surfactant [(polyoxyethylene (3) lauryl ether sodium sulfate)/(polyoxyethylene (10) lauryl ether)=1/1 (w/w)] was diluted with ion-exchanged water such that its content was 150 mg/kg, to prepare a cleaning liquid. In a 1-L stainless steel beaker for cleaning test, 600 mL of the cleaning liquid and the 5 sheets of polyester fabrics obtained in the above (2-2) were charged. Using a tergotometer (MS-8212, manufactured by Ueshima Seisakusho Co., Ltd.), the polyester fabrics were washed under a condition at 85 rpm and 20° C. for 10 minutes. The resulting polyester fabrics were rinsed with a large quantity of water, dehydrated by the twin tub washing machine, and then naturally dried for 24 hours.

[Evaluation of Cleaning Rate and Cleaning Rate Enhancement]

Reflectances of a polyester raw fabric before contamination and polyester fabrics before and after cleaning at 460 nm were measured with a spectrophotometer (SE-2000, manufactured by Nippon Denshoku Industries Co., Ltd.), and the cleaning rate (%) was determined according to the following equation.

Cleaning rate (%)=100×[{(Reflectance after cleaning)−(Reflectance before cleaning)}/{(Reflectance of raw fabric)−(Reflectance before cleaning)}]

In addition, a cleaning rate enhancement (%) was determined from a difference from the cleaning rate of the blank having the content of the component (A) of 0 mg/kg in the above (2-1) according to the following equation.

Cleaning rate enhancement (%)=[{Cleaning rate (%) of component (A) of 30 mg/kg}−{Cleaning rate (%) of component (A) of 0 mg/kg}]

[Evaluation of Carbon Resoiling Preventing Properties]

A surfactant [(polyoxyethylene (3) lauryl ether sodium sulfate)/(polyoxyethylene (10) lauryl ether)=1/1 (w/w)] was diluted with ion-exchanged water such that its content was 150 mg/kg, to obtain a cleaning liquid. In 600 mL of this cleaning liquid, 20 mg of carbon black elected by Japan Oil Chemists' Society (Asahi standard carbon black for cleaning, manufactured by Asahi Carbon Co., Ltd.) was added, and ultrasonic waves were irradiated with an ultrasonic wave oscillator (UT206, manufactured by Sharp Manufacturing Systems Corporation) for 1 hour. Subsequently, this dispersion liquid was transferred into the 1-L stainless steel beaker of the tergotometer, in which were then charged the 5 sheets of polyester fabrics obtained in the above (2-1). Using the tergotometer, the polyester was subjected to resoiling treatment under a condition at 85 rpm and 20° C. for 10 minutes. The resulting polyester fabrics were rinsed with a large quantity of water, dehydrated by the twin tub washing machine, and then naturally dried for 24 hours. Subsequently, reflectances of a polyester raw fabric before cleaning and polyester fabrics after resoiling at 550 nm were measured with the spectrophotometer, and the carbon resoiling prevention rate (%) was determined according to the following equation. It is meant that the higher the value of the carbon resoiling prevention rate, the more excellent the resoiling preventing performance.

Carbon resoiling prevention rate (%)=100×[(Reflectance after resoiling)/(Reflectance of raw fabric)]

[Evaluation of Formulation Fluidity]

An aqueous solution (5 mL) containing 20% by mass of a surfactant (polyoxyethylene (10) lauryl ether (a trade name: "EMULGEN 110L", manufactured by Kao Corporation) in terms of an active component and 3% by mass of the aforementioned polysaccharide derivative were prepared in a 10-mL screw tube (graduated) and dissolved while stirring (at 20° C.) using a stirrer for 24 hours.

The resulting solution was turned upside down together with the screw tube, and the fluidity was evaluated through visual inspection.

A time required when almost all of the solution (90% or more) moves from the upper part to the lower part was measured.

The time required when almost all of the solution (90% or more) moves from the upper part to the lower part is preferably within 5 seconds, and more preferably within 3 seconds.

Examples 2 to 12 and Comparative Examples 1 to 3

Cellulose derivatives shown in Table 1 were synthesized by adopting the same method as in Example 1. In addition, the cleaning performance, the resoiling preventing properties, and the formulation fluidity were evaluated in the same manner as in Example 1.

Example 13

10 g of the powdery cellulose derivative synthesized in Example 1 was charged in a 1-L separable flask, and nitrogen was allowed to pass therethrough. 43.3 g of IPA and 4.8 g of ion-exchanged water were added and stirred at 100 rpm for 5 minutes, and then, 5.4 g of a 48% sodium hydroxide aqueous solution was added, followed by further stirring for 15 minutes. Subsequently, 0.8 g of sodium monochloroacetate (manufactured by Wako Chemical Industries, Ltd.) was added, to undergo a carboxymethylation reaction at 70° C. for 2.5 hours. Thereafter, 3.5 g of acetic acid was added, and stirring was performed for 30 minutes, to undergo a neutralization reaction.

The resulting suspension liquid was transferred equally into two 50-mL centrifuge tubes and centrifuged with a high-speed cooling centrifuge (CR21G III, manufactured by Hitachi Koki Co., Ltd.). A supernatant was removed through decantation, and an 85% IPA aqueous solution in the same amount as that of the removed supernatant was added, to undergo redispersion. Again, the operation of centrifugation and redispersion was repeated, and after performing the third centrifugation, a precipitate was taken out. The resulting precipitate was vacuum-dried at 80° C. overnight by using a vacuum dryer (VR-420, manufactured by Advantec Co., Ltd.) and then crushed with an extreme mill (MX-1200X™, manufactured by Waring), to obtain a powdery cellulose derivative.

Using the resulting cellulose derivative, the cleaning performance, the resoiling preventing properties, and the formulation fluidity were evaluated in the same methods as in Example 1.

Example 14

A cellulose derivative shown in Table 1 was synthesized by adopting the same method as in Example 13.

In addition, the cleaning performance, the resoiling preventing properties, and the formulation fluidity were evaluated in the same methods as in Example 1.

Comparative Example 4

70 g of HEC was charged in a 1-L separable flask, and nitrogen was allowed to pass therethrough. 56.8 g of ion-exchanged water and 314.4 g of IPA were added and stirred at 200 rpm for 5 minutes, and then, 8.2 g of a 48% sodium hydroxide aqueous solution was added, followed by further stirring for 15 minutes. Subsequently, 10.4 g of GMAC was added, to undergo a cationization reaction at 50° C. for 1.5 hours. Furthermore, 34.3 g of 3-chloro-2-hydroxypropyl dodecyldimethylammonium chloride (CDDA, manufactured by Yokkaichi Chemical Co., Ltd.) was added, to undergo a reaction at 50° C. for 1.5 hours. Thereafter, 8.2 g of a 90% acetic acid aqueous solution was added, and stirring was performed for 30 minutes, to undergo a neutralization reaction.

The resulting suspension liquid was transferred equally into two 500-mL centrifuge tubes and centrifuged with a high-speed cooling centrifuge (CR21G III, manufactured by Hitachi Koki Co., Ltd.). A supernatant was removed through decantation, and an 85% IPA aqueous solution in the same amount as that of the removed supernatant was added, to undergo redispersion. Again, the operation of centrifugation and redispersion was repeated, and after performing the third centrifugation, a precipitate was taken out. The resulting precipitate was vacuum-dried at 80° C. overnight by using a vacuum dryer (VR-420, manufactured by Advantec Co., Ltd.) and then crushed with an extreme mill (MX-1200X™, manufactured by Waring), to obtain a powdery cellulose derivative.

Using the resulting cellulose derivative, the cleaning performance, the resoiling preventing properties, and the formulation fluidity were evaluated in the same methods as in Example 1.

TABLE 1

| | Hydroxyalkylated polysaccharide | | Hydrophobizing agent | | Cationizing agent Reaction agent | Polysaccharide derivative | | | | | | Evaluation | | |
|---|---|---|---|---|---|---|---|---|---|---|---|---|---|---|
| | Structure | Molecular weight (× 10,000) | Binding species | Chain length (R) | | $MS_R$ | $MS_{R-C}$ | $MS_C$ | $MS_R/MS_C$ or $MS_{R-C}$ | $MS_A$ | $MS_A/MS_C$ | Cleaning rate enhancement[*1] | Carbon resoiling prevention rate[*2] | Formulation fluidity |
| Example 1 | HEC | 15 | Glycidyl | C12 | GMAC | 0.019 | — | 0.10 | 0.19 | — | — | 22% | 25% | Within 3 sec |
| Example 2 | HEC | 15 | Glycidyl | C12 | GMAC | 0.011 | — | 0.10 | 0.11 | — | — | 21% | 24% | Within 3 sec |
| Example 3 | HEC | 15 | Glycidyl | C12 | GMAC | 0.020 | — | 0.20 | 0.10 | — | — | 22% | 22% | Within 3 sec |
| Example 4 | HEC | 15 | Glycidyl | C4 | GMAC | 0.020 | — | 0.10 | 0.20 | — | — | 19% | 27% | Within 3 sec |
| Example 5 | HEC | 15 | Epoxy | C12 | GMAC | 0.020 | — | 0.10 | 0.20 | — | — | 18% | 25% | Within 3 sec |
| Example 6 | HEC | 15 | Glycidyl | C16 | GMAC | 0.015 | — | 0.12 | 0.13 | — | — | 20% | 25% | — |
| Example 7 | HEC | 9 | Glycidyl | C12 | GMAC | 0.019 | — | 0.12 | 0.16 | — | — | 21% | 25% | Within 3 sec |
| Example 8 | HEC | 30 | Glycidyl | C12 | GMAC | 0.020 | — | 0.10 | 0.20 | — | — | 24% | 22% | About 10 sec |
| Example 9 | HEC | 72 | Glycidyl | C12 | GMAC | 0.018 | — | 0.08 | 0.23 | — | — | 28% | 20% | — |
| Example 10 | HEC | 15 | Epoxy | C12 | GMAC | 0.020 | — | 0.30 | 0.07 | — | — | 18% | 17% | — |
| Example 11 | HEC | 15 | Glycidyl | C12 | GMAC | 0.050 | — | 0.08 | 0.63 | — | — | 17% | 17% | — |
| Example 12 | HEC | 15 | Glycidyl | C12 | GMAC | 0.020 | — | 0.39 | 0.05 | — | — | 22% | 17% | — |
| Example 13 | HEC | 15 | Glycidyl | C12 | GMAC | 0.019 | — | 0.10 | 0.19 | 0.30 | 3.00 | 16% | 25% | — |
| Example 14 | HEC | 15 | Glycidyl | C12 | GMAC | 0.019 | — | 0.10 | 0.19 | 0.04 | 0.40 | 20% | 25% | — |

TABLE 1-continued

| | Hydroxyalkylated polysaccharide | | Hydrophobizing agent | | Cationizing agent Reaction agent | Polysaccharide derivative | | | | | | Evaluation | | |
| --- | --- | --- | --- | --- | --- | --- | --- | --- | --- | --- | --- | --- | --- | --- |
| | Structure | Molecular weight (× 10,000) | Binding species | Chain length (R) | | $MS_R$ | $MS_{R-C}$ | $MS_C$ | $MS_R/MS_C$ or $MS_{R-C}$ | $MS_A$ | $MS_A/MS_C$ | Cleaning rate enhancement[*1] | Carbon resoiling prevention rate[*2] | Formulation fluidity |
| Comparative Example 1 | HEC | 100 | Glycidyl | C12 | GMAC | 0.019 | — | 0.09 | 0.21 | — | — | 28% | 15% | 1 day or more |
| Comparative Example 2 | HEC | 30 | Glycidyl | C12 | — | 0.019 | — | — | — | — | — | 6% | 22% | — |
| Comparative Example 3 | HEC | 15 | — | — | GMAC | — | — | 0.12 | — | — | — | 13% | 25% | Within 3 sec |
| Comparative Example 4 | HEC | 15 | Glycidyl-ammonium | C12 | GMAC | — | 0.015 | 0.10 | 0.15 | — | — | 13% | 24% | — |

[*1]Cleaning rate enhancement: [Cleaning rate (%) of fabric treated with each sample] – [Cleaning rate (3%) of non-treated fabric]
[*2]Carbon resoiling prevention rate: Degree of attachment of carbon black (measured from reflectance)

The polysaccharide raw materials (hydroxyalkylated polysaccharides) used in Table 1 are as follows.

HEC, Molecular Weight of 150,000:
Hydroxyethyl cellulose, "Natrosol 250 JR" (a trade name), manufactured by Ashland Inc., weight average molecular weight=150,000, degree of substitution of hydroxyethyl group=2.5

HEC, Molecular Weight of 90,000:
Hydroxyethyl cellulose, "Natrosol 250 LR" (a trade name), manufactured by Ashland Inc., weight average molecular weight=90,000, degree of substitution of hydroxyethyl group=2.5

HEC, Molecular Weight of 300,000:
Hydroxyethyl cellulose, "Natrosol 250 GR" (a trade name), manufactured by Ashland Inc., weight average molecular weight=300,000, degree of substitution of hydroxyethyl group=2.5

HEC, Molecular Weight of 720,000:
Hydroxyethyl cellulose, "Natrosol 250 MR" (a trade name), manufactured by Ashland Inc., weight average molecular weight=720,000, degree of substitution of hydroxyethyl group=2.5

HEC, Molecular Weight of 1,000,000:
Hydroxyethyl cellulose, "Natrosol 250 HR" (a trade name), manufactured by Ashland Inc., weight average molecular weight=1,000,000, degree of substitution of hydroxyethyl group=2.5

In addition, the hydrophobizing agents used in Table 1 are as follows.

Glycidyl, C12:
Lauryl glycidyl ether, "EPOGOSEY LA(D)" (a trade name), manufactured by Yokkaichi Chemical Co., Ltd.

Glycidyl, C16:
Cetyl glycidyl ether, "CE-EP" (a trade name), manufactured by Yokkaichi Chemical Co., Ltd.

Glycidyl, C4:
Butyl glycidyl ether, "DY-BP" (a trade name), manufactured by Yokkaichi Chemical Co., Ltd.

Epoxy, C12:
1,2-Epoxytetradecane, manufactured by Wako Pure Chemical Industries, Ltd.

Glycidylammonium, C12:
3-Chloro-2-hydroxypropyldodecyldimethylammonium chloride, CDDA (a trade name), manufactured by Yokkaichi Chemical Co., Ltd.

As is evident from Table 1, it has become clear that according to treatment with the polysaccharide derivative of the present invention, not only attachment of sebum soil is suppressed, and the cleaning performance is enhanced, but also resoiling due to powder soil by carbon black, etc. during washing is prevented from occurring.

INDUSTRIAL APPLICABILITY

In accordance with the present invention, not only the cleaning performance can be enhanced, but also resoiling due to powder soil during washing can be suppressed. When the polysaccharide derivative of the present invention is added to a cleaning agent composition for clothing, it is able to impart extremely excellent effects, such as enhancement in cleaning performance and suppression of resoiling preventing properties, against fabrics treated with such a composition.

The invention claimed is:

1. A polysaccharide derivative having a cationic group and a hydrocarbon group (R) having 2 or more and 22 or less carbon atoms,
wherein:
the cationic group is a quaternary ammonium salt, or a tertiary amine capable of being converted into a quaternary ammonium salt upon addition of a proton, and its quaternary ammonium salt;
the hydrocarbon group (R) is bound to a group resulting from eliminating a hydrogen atom from a hydroxy group of a hydroxyalkylated polysaccharide via a group represented by the following formula (1):

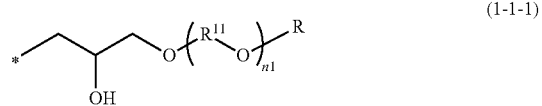

(1-1-1)

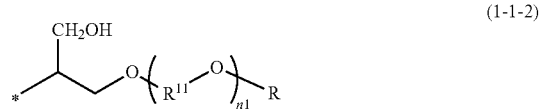

(1-1-2)

(1-2-1)

(1-2-2)

-continued

*—R　(1-3)

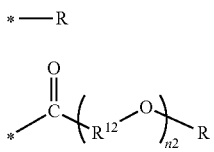
(1-4)

wherein:
- Z represents a single bond or a divalent hydrocarbon group having an oxygen atom;
- R represents a hydrocarbon group having 2 or more and 22 or less carbon atoms; and
- * represents a binding position to a group resulting from eliminating a hydrogen atom from a hydroxy group of the hydroxyalkylated polysaccharide;
- the hydroxyalkylated polysaccharide is a hydroxyethylated polysaccharide;
- the degree of substitution ($MS_R$) of the hydrocarbon group (R) is 0.001 or more and 0.08 or less; and
- the hydroxyalkylated polysaccharide has a weight average molecular weight of 10,000 or more and 200,000 or less.

2. The polysaccharide derivative according to claim 1, wherein the degree of substitution ($MS_C$) of the cationic group is 0.001 or more and 1 or less.

3. The polysaccharide derivative according to claim 1, wherein the degree of substitution ($MS_C$) of the cationic group is 0.001 or more and 0.5 or less.

4. The polysaccharide derivative according to claim 1, wherein the degree of substitution ($MS_C$) of the cationic group is 0.001 or more and 0.25 or less, and the degree of substitution ($MS_R$) of the hydrocarbon group (R) is 0.001 or more and 0.05 or less.

5. The polysaccharide derivative according to claim 1, wherein the formula (1) is selected from a group represented by any one of the formulae (1-1-1), (1-1-2), (1-2-1), (1-2-2), (1-3), and (1-4):

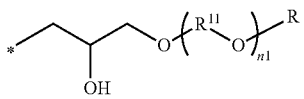
(1-1-1)

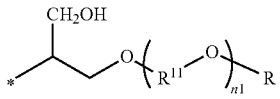
(1-1-2)

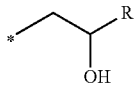
(1-2-1)

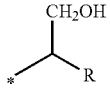
(1-2-2)

*—R　(1-3)

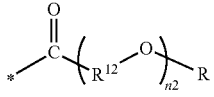
(1-4)

wherein:
- each $R^{11}$ independently represents an alkylene group having 2 to 4 carbon atoms;
- R represents a hydrocarbon group having 2 or more and 22 or less carbon atoms;
- * represents a binding position to a group resulting from eliminating a hydrogen atom from a hydroxy group of the hydroxyalkylated polysaccharide;
- n1 represents an average addition molar number of —$R^{11}$—O—; and
- n1 is 0 or more and 30 or less.

6. The polysaccharide derivative according to claim 1, wherein the carbon number of the hydrocarbon group (R) is 4 or more and 22 or less.

7. The polysaccharide derivative according to claim 1, wherein the carbon number of the hydrocarbon group (R) is 4 or more and 16 or less.

8. The polysaccharide derivative according to claim 1, wherein the polysaccharide is cellulose or guar gum.

9. The polysaccharide derivative according to claim 1, wherein the cationic group is represented by the formula (2-1) or formula (2-2):

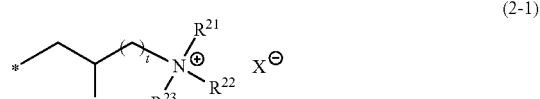
(2-1)

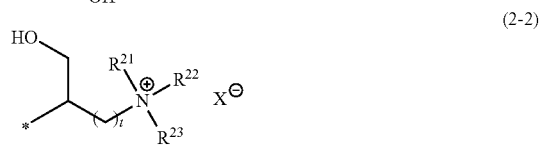
(2-2)

wherein:
- $R^{21}$ to $R^{23}$ each independently represent a hydrocarbon group having 1 or more and 24 or less carbon atoms;
- $X^-$ represents an anion;
- t represents an integer of 0 or more and 3 or less; and
- * represents a binding position to a group resulting from eliminating a hydrogen atom from a hydroxy group of the hydroxyalkylated polysaccharide.

10. The polysaccharide derivative according to claim 1, wherein the weight average molecular weight is 30,000 or more and 200,000 or less.

11. The polysaccharide derivative according to claim 1, wherein the ratio ($MS_R/MS_C$) of the degree of substitution ($MS_R$) of the hydrocarbon group (R) to the degree of substitution ($MS_C$) of the cationic group is 0.19 or more.

12. The polysaccharide derivative according to claim 11, wherein the ratio ($MS_R/MS_C$) of the degree of substitution ($MS_R$) of the hydrocarbon group (R) to the degree of substitution ($MS_C$) of the cationic group is 1 or less.

13. The polysaccharide derivative according to claim 1, further having an anionic group.

14. The polysaccharide derivative according to claim 13, wherein ratio ($MS_A/MS_C$) of the degree of substitution ($MS_A$) of the anionic group to the degree of substitution ($MS_C$) of the cationic group is 3 or less.

15. The polysaccharide derivative according to claim 13, wherein ratio ($MS_A/MS_C$) of the degree of substitution ($MS_A$) of the anionic group to the degree of substitution ($MS_C$) of the cationic group is 1.5 or less.

16. The polysaccharide derivative according to claim 13, wherein the degree of substitution ($MS_C$) of the cationic group is 0.001 or more and 0.5 or less, the ratio ($MS_R/MS_C$)

of the degree of substitution ($MS_R$) of the hydrocarbon group (R) to the degree of substitution ($MS_C$) of the cationic group is 0.19 or more and 1 or less, and the ratio ($MS_A/MS_C$) of the degree of substitution ($MS_A$) of the anionic group to the degree of substitution ($MS_C$) of the cationic group is 1.5 or less.

17. A method for producing the polysaccharide derivative according to claim 1, the method comprising:
   introducing the hydrocarbon group (R) having 2 or more and 22 or less carbon atoms into a hydroxyalkylated polysaccharide having a weight average molecular weight of 10,000 or more and 200,000 or less via the group represented by the formula (1), followed by allowing the hydroxyalkylated polysaccharide to react with a cationizing agent.

18. The method for producing the polysaccharide derivative according to claim 17, wherein the method does not comprise a cleaning step between the introduction reaction of the hydrocarbon group (R) and the introduction reaction of the cationic group.

19. The method for producing the polysaccharide derivative according to claim 17, wherein the introduction reaction of the hydrocarbon group is performed in an alkaline compound, and wherein the molar ratio of the alkaline compound to the cationizing agent [(alkaline compound)/(cationizing agent)] is 0.1 or more.

\* \* \* \* \*

UNITED STATES PATENT AND TRADEMARK OFFICE
CERTIFICATE OF CORRECTION

PATENT NO. : 11,401,350 B2
APPLICATION NO. : 16/769527
DATED : August 2, 2022
INVENTOR(S) : Akihiro Koyama et al.

Page 1 of 1

It is certified that error appears in the above-identified patent and that said Letters Patent is hereby corrected as shown below:

In the Claims

Column 40, Line 47, to Column 41, Line 9, of Claim 1 the formulae:

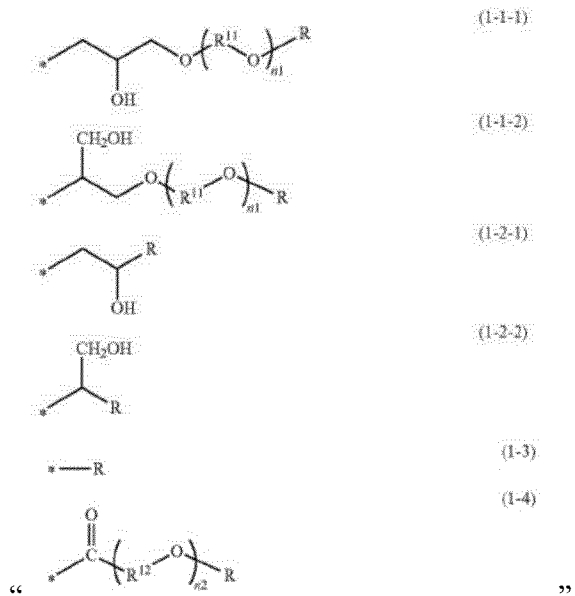

Should be deleted and replaced with --* —Z—R   ( 1 )--.

Signed and Sealed this
Twenty-seventh Day of September, 2022

Katherine Kelly Vidal
*Director of the United States Patent and Trademark Office*